United States Patent
Xu et al.

(10) Patent No.: US 11,277,213 B2
(45) Date of Patent: Mar. 15, 2022

(54) CROSS-LINK INTERFERENCE MEASUREMENT TRANSMISSION SCHEMES

(71) Applicant: QUALCOMM Incorporated, San Diego, CA (US)

(72) Inventors: Huilin Xu, San Diego, CA (US); Tingfang Ji, San Diego, CA (US); Alexandros Manolakos, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 16/735,051

(22) Filed: Jan. 6, 2020

(65) Prior Publication Data

US 2020/0228212 A1    Jul. 16, 2020

(30) Foreign Application Priority Data

Jan. 11, 2019    (GR) .............................. 20190100019

(51) Int. Cl.
*H04B 17/345*    (2015.01)
*H04W 72/04*    (2009.01)
*H04L 5/14*    (2006.01)

(52) U.S. Cl.
CPC ............ *H04B 17/345* (2015.01); *H04L 5/14* (2013.01); *H04W 72/0406* (2013.01); *H04W 72/0446* (2013.01)

(58) Field of Classification Search
CPC ................ H04B 17/345; H04J 11/005; H04W 72/1278–72/1289; H04L 5/0092
See application file for complete search history.

(56) References Cited

U.S. PATENT DOCUMENTS

| | | | |
|---|---|---|---|
| 2013/0322276 A1 | 12/2013 | Pelletier et al. | |
| 2018/0367202 A1* | 12/2018 | Yang | H04L 1/0071 |
| 2019/0274053 A1 | 9/2019 | Wang et al. | |
| 2020/0344614 A1* | 10/2020 | Takano | H04W 72/04 |

(Continued)

FOREIGN PATENT DOCUMENTS

| | | | | |
|---|---|---|---|---|
| EP | 3567760 A1 * | 11/2019 | | H04J 11/00 |
| WO | WO-2017183866 A1 | 10/2017 | | |

(Continued)

OTHER PUBLICATIONS

Huawei, et al., "Consideration on Cross-link Interference in IAB", 3GPP Draft, R1-1812203, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2818-Nov. 16, 2018, Nov. 11, 2018 (Nov. 11, 2018), 10 pages, XP051554075, Retrieved from the Internet: URL: http://www.3gpp.org/ftp/Meetings%5F3GPP%5FSYNC/RAN1/Docs/R1%2D1812283%2Ezip. [retrieved on Nov. 11, 2018] Consideration on CLI measurement framework; p. 5, paragraph 3.1-p. 7; figures 8,9 Consideration on CLI mitigation method; p. 7, paragraph 3.2-p. 8.

(Continued)

*Primary Examiner* — Hoon J Chung
(74) *Attorney, Agent, or Firm* — Holland & Hart LLP

(57) ABSTRACT

Methods, systems, and devices for wireless communications are described. A first user equipment (UE) may identify a time division duplexing (TDD) configuration, where the TDD configuration includes a symbol pattern for a slot. A network may determine an overlap between a downlink symbol or a flexible symbol and an uplink symbol during symbols of the slot based on a second TDD configuration of a second UE, resulting in a cross-link interference (CLI). The second UE may measure the CLI based on implicit or explicit configurations that enable the measurement. Additionally or alternatively, the second UE may measure the CLI based on uplink signaling used for measuring the CLI, (Continued)

including dedicated signaling used for measuring CLI. In some cases, the uplink signaling may include uplink data, CLI reference signals, or random data.

30 Claims, 20 Drawing Sheets

(56) References Cited

FOREIGN PATENT DOCUMENTS

| WO | WO 2018/128851 A2 * | 7/2018 | ............... H04L 7/00 |
| WO | WO-2018120065 A1 | 7/2018 | |
| WO | WO 2018/223386 A1 * | 12/2018 | ............ H04W 72/04 |
| WO | WO 2019/222942 A1 * | 11/2019 | ............ H04W 24/10 |

OTHER PUBLICATIONS

Huawei, et al., "Physical Layer Design for NR IAB", 3GPP Draft, R1-1812198, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), 15 pages, XP051554070, Retrieved from the Internet: URL: http://www.3gpp.org/ftp/Meetings%5F3GPP%5FSYNC/RAN1/Docs/R1%2D1812198%2Ezip. [retrieved on Nov. 11, 2018] Backhaul 1 ink condition notification; p. 2. paragraph 2.2 IAB node timing alignment;p. 8, paragraph 4.2-p. 18 Cross-link interference and management; p. 9, paragraph 5-p. 12.

Intel Corporation: "PHY Layer Enhancements for NR IAB", 3GPP Draft, R1-1812486, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), 13 pages, XP051554430, Retrieved from the Internet: URL: http://www.3gpp.org/ftp/Meetings%5F3GPP%5FSYNC/RAN1/Docs/R1%2D1812486%2Ezip. [retrieved on Nov. 11, 2018] Cross-link interference management; p. 9. paragraph 6-p. 10.

International Search Report and Written Opinion—PCT/US2020/012515—ISA/EPO—dated Apr. 14, 2020 (191014WO).

* cited by examiner

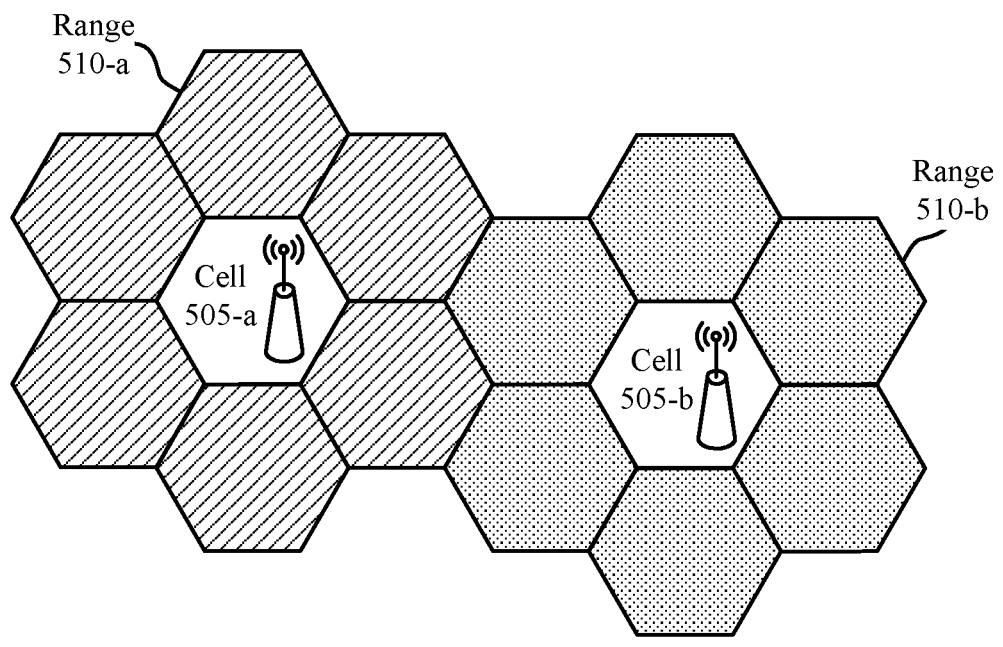
 Cell where Uplink Transmission is Configured in the Same Symbol
FIG. 5

CROSS-LINK INTERFERENCE MEASUREMENT TRANSMISSION SCHEMES

CROSS REFERENCE

The present Application for Patent claims the benefit of Greece Provisional Patent Application No. 20190100019 by Xu et al., entitled "UE TRANSMISSION SCHEMES FOR RSSI MEASUREMENT FOR UE-TO-UE CLI," filed Jan. 11, 2019, assigned to the assignee hereof, and expressly incorporated herein.

BACKGROUND

The following relates generally to wireless communications, and more specifically to cross-link interference measurement transmission schemes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Neighboring cells in a time division duplexing (TDD) system may use different configurations for TDD communications. In some cases, the different TDD configurations may lead to overlap for transmissions in opposite directions. For example, an uplink transmission by a first UE may interfere with downlink reception at a second UE if the uplink transmission and downlink reception are scheduled for the same time. Interference between UEs using different TDD configurations may be known as cross-link interference (CLI). Current techniques for managing CLI in a TDD system may result in inefficient use of communication resources.

SUMMARY

The described techniques relate to improved methods, systems, devices, and apparatuses that support cross-link interference (CLI) measurement transmission schemes. Generally, the described techniques provide for measuring, at a victim UE, CLI based on uplink signaling from an aggressor UE. The victim UE and the aggressor UE may each receive time division duplexing (TDD) configurations that identify uplink, downlink, and flexible (can be uplink or downlink) symbols (e.g., a symbol pattern) for communications with a respective cell. For example, the aggressor UE may receive a TDD configuration for communications with a first cell, and the victim UE may receive a TDD configuration for communications with a second cell. Accordingly, the CLI may occur when the aggressor UE is scheduled for uplink transmission to the first cell in a corresponding symbol period that the victim UE is scheduled for receiving downlink transmissions from the second cell. In some cases, the first cell and the second cell may be associated with a respective first base station and a second base station. Additionally or alternatively, the first cell and the second cell may be associated with a same base station, or may be the same cell, where UEs within the same base station or cell cause the CLI.

In some cases, the uplink signaling used to measure the CLI may be dedicated signaling that the aggressor UE transmits during uplink symbols of its TDD configuration for communicating with the first cell. For example, the dedicated signaling may include uplink data, uplink reference signals, uplink control channel signaling, CLI reference signals (e.g., uplink demodulation reference signals (DMRSs), uplink channel state information reference signal (CSI-RS), configured for use in measuring CLI), random or pseudo-randomly generated symbols, or a combination of these, that the victim UE uses in its CLI measurement. Additionally or alternatively, the victim UE may measure the CLI based on the aggressor UE receiving a second TDD configuration for its communications with the first cell that changes a downlink symbol to an uplink symbol, while the victim UE's TDD configuration indicates a corresponding downlink symbol. Or, the victim UE may receive a second TDD configuration for its communications with the second cell that changes an uplink symbol to a downlink symbol, the victim UE's TDD configuration indicating a corresponding uplink symbol. Or, a combination may be used where the TDD configuration is changed for both the aggress UE and the victim UE to facilitate a CLI measurement. In some cases, the CLI may be measured based on a signal strength (e.g., reference signal received power (RSRP), received signal strength indication (RSSI)) of the uplink signaling. The victim UE may determine whether the measured CLI is valid or not based on whether the CLI, or the signal strength measured to determine CLI, exceeds a signal strength threshold.

Additionally, the aggressor UE may identify a timing advance (TA) for transmitting uplink information or data (e.g., the uplink signaling for measuring the CLI) for its corresponding TDD configuration to communicate with the first cell. In some cases, the aggressor UE may identify a second TA (e.g., a zero-valued TA) that is specific to transmitting the uplink signaling for measuring the CLI. Additionally or alternatively, based on a misalignment of uplink and downlink symbols for measuring the CLI at the victim cell (e.g., from the TA, multiple aggressor cells causing the CLI), the victim cell may be configured with a measurement window that includes a first timing offset for the beginning of the measurement window, a second timing offset for the end of the measurement window, or a combination thereof. One or both of the first timing offset or the second timing offset may be in units other than a symbol period (e.g., the timing offset may be a sub-symbol duration, the timing offset being less than a symbol period). This measurement window may span across boundaries of one or more downlink symbols of its TDD configuration.

A method of wireless communications at a second wireless device is described. The method may include identifying a TDD configuration for the second wireless device, where the TDD configuration includes a symbol pattern for a slot of a set of slots, receiving a configuration for transmitting, to a first wireless device, dedicated signaling for measuring a CLI, and transmitting the dedicated signaling in at least one symbol period of the slot according to the received configuration.

An apparatus for wireless communications at a second wireless device is described. The apparatus may include a processor, memory in electronic communication with the processor, and instructions stored in the memory. The instructions may be executable by the processor to cause the apparatus to identify a TDD configuration for the second wireless device, where the TDD configuration includes a symbol pattern for a slot of a set of slots, receive a configuration for transmitting, to a first wireless device, dedicated signaling for measuring a CLI, and transmit the dedicated signaling in at least one symbol period of the slot according to the received configuration.

Another apparatus for wireless communications at a second wireless device is described. The apparatus may include means for identifying a TDD configuration for the second wireless device, where the TDD configuration includes a symbol pattern for a slot of a set of slots, receiving a configuration for transmitting, to a first wireless device, dedicated signaling for measuring a CLI, and transmitting the dedicated signaling in at least one symbol period of the slot according to the received configuration.

A non-transitory computer-readable medium storing code for wireless communications at a second wireless device is described. The code may include instructions executable by a processor to identify a TDD configuration for the second wireless device, where the TDD configuration includes a symbol pattern for a slot of a set of slots, receive a configuration for transmitting, to a first wireless device, dedicated signaling for measuring a CLI, and transmit the dedicated signaling in at least one symbol period of the slot according to the received configuration.

In some examples of the method, apparatuses, and non-transitory computer-readable medium described herein, transmitting the dedicated signaling may include operations, features, means, or instructions for transmitting CLI reference signals in the at least one symbol period.

In some examples of the method, apparatuses, and non-transitory computer-readable medium described herein, the transmitted CLI reference signals may be generated based on a Zadoff-Chu sequence.

In some examples of the method, apparatuses, and non-transitory computer-readable medium described herein, the transmitted CLI reference signals may be generated based on a Gold sequence.

In some examples of the method, apparatuses, and non-transitory computer-readable medium described herein, the CLI reference signals include uplink DMRSs, or uplink CSI-RSs, or a combination thereof.

In some examples of the method, apparatuses, and non-transitory computer-readable medium described herein, transmitting the CLI reference signals in the at least one symbol period may include operations, features, means, or instructions for transmitting the CLI reference signals in the at least one symbol period without corresponding uplink data.

In some examples of the method, apparatuses, and non-transitory computer-readable medium described herein, transmitting the dedicated signaling may include operations, features, means, or instructions for transmitting pseudo-randomly generated symbols in the at least one symbol period.

In some examples of the method, apparatuses, and non-transitory computer-readable medium described herein, receiving the configuration for transmitting dedicated signaling may include operations, features, means, or instructions for receiving a second TDD configuration for the slot, the second TDD configuration changing a downlink transmission direction indicated by the identified TDD configuration for the at least one symbol period to an uplink transmission direction, and transmitting the dedicated signaling may include operations, features, means, or instructions for transmitting uplink data in the at least one symbol period according to the received configuration.

In some examples of the method, apparatuses, and non-transitory computer-readable medium described herein, receiving the configuration may include operations, features, means, or instructions for receiving the configuration in radio resource control (RRC) signaling or downlink control information (DCI).

In some examples of the method, apparatuses, and non-transitory computer-readable medium described herein, the DCI provides a dynamic configuration of the dedicated signaling.

In some examples of the method, apparatuses, and non-transitory computer-readable medium described herein, the DCI provides a semi-persistent data channel configuration of the dedicated signaling.

In some examples of the method, apparatuses, and non-transitory computer-readable medium described herein, the RRC signaling provides a periodic configuration of the dedicated signaling.

Some examples of the method, apparatuses, and non-transitory computer-readable medium described herein may further include operations, features, means, or instructions for identifying a TA for an uplink data channel of the slot and applying the identified TA to transmit the dedicated signaling.

Some examples of the method, apparatuses, and non-transitory computer-readable medium described herein may further include operations, features, means, or instructions for identifying a first TA for an uplink data channel of the slot, identifying a second TA for the dedicated signaling of the slot, the first TA different from the second TA, and applying the second TA to transmit the dedicated signaling.

Some examples of the method, apparatuses, and non-transitory computer-readable medium described herein may further include operations, features, means, or instructions for determining, based on the first TA and the second TA, that an uplink transmission scheduled during an uplink symbol period subsequent to the at least one symbol period collides with the dedicated signaling, and dropping, based on the determining, the uplink transmission during the uplink symbol period.

In some examples of the method, apparatuses, and non-transitory computer-readable medium described herein, the second TA may be a zero-valued TA.

Some examples of the method, apparatuses, and non-transitory computer-readable medium described herein may further include operations, features, means, or instructions for receiving a TA command indicating the second TA.

In some examples of the method, apparatuses, and non-transitory computer-readable medium described herein, transmitting the dedicated signaling may include operations, features, means, or instructions for transmitting, in the at least one symbol period of the slot, the dedicated signaling using one or more uplink transmit beams different from a serving transmit beam of a cell serving the second wireless device.

In some examples of the method, apparatuses, and non-transitory computer-readable medium described herein, transmitting the dedicated signaling may include operations, features, means, or instructions for transmitting, in the at least one symbol period of the slot, the dedicated signaling using a serving precoding matrix In some examples of the method, apparatuses, and non-transitory computer-readable medium described herein, the second wireless device and the first wireless device may be associated with a same cell of a base station.

In some examples of the method, apparatuses, and non-transitory computer-readable medium described herein, the second wireless device may be associated with a first cell served by a base station, and the first wireless device may be associated with a second cell served by the base station.

In some examples of the method, apparatuses, and non-transitory computer-readable medium described herein, the second wireless device may be associated with a first cell served by a first base station, and the first wireless device may be associated with a second cell served by a second base station.

A method of wireless communications at a first wireless device is described. The method may include identifying, for the first wireless device, a TDD configuration including a symbol pattern for a slot of a set of slots, receiving a configuration for measuring uplink signaling from a second wireless device, the uplink signaling for measuring a CLI, receiving, according to the received configuration, the uplink signaling in at least one symbol period of the slot, and determining the CLI based on the received uplink signaling.

An apparatus for wireless communications at a first wireless device is described. The apparatus may include a processor, memory in electronic communication with the processor, and instructions stored in the memory. The instructions may be executable by the processor to cause the apparatus to identify, for the first wireless device, a TDD configuration including a symbol pattern for a slot of a set of slots, receive a configuration for measuring uplink signaling from a second wireless device, the uplink signaling for measuring a CLI, receive, according to the received configuration, the uplink signaling in at least one symbol period of the slot, and determine the CLI based on the received uplink signaling.

Another apparatus for wireless communications at a first wireless device is described. The apparatus may include means for identifying, for the first wireless device, a TDD configuration including a symbol pattern for a slot of a set of slots, receiving a configuration for measuring uplink signaling from a second wireless device, the uplink signaling for measuring a CLI, receiving, according to the received configuration, the uplink signaling in at least one symbol period of the slot, and determining the CLI based on the received uplink signaling.

A non-transitory computer-readable medium storing code for wireless communications at a first wireless device is described. The code may include instructions executable by a processor to identify, for the first wireless device, a TDD configuration including a symbol pattern for a slot of a set of slots, receive a configuration for measuring uplink signaling from a second wireless device, the uplink signaling for measuring a CLI, receive, according to the received configuration, the uplink signaling in at least one symbol period of the slot, and determine the CLI based on the received uplink signaling.

In some examples of the method, apparatuses, and non-transitory computer-readable medium described herein, receiving the uplink signaling may include operations, features, means, or instructions for receiving dedicated signaling in the at least one symbol period of the slot according to the received configuration.

In some examples of the method, apparatuses, and non-transitory computer-readable medium described herein, receiving the dedicated signaling may include operations, features, means, or instructions for receiving CLI reference signals in the at least one symbol period of the slot according to the received configuration.

In some examples of the method, apparatuses, and non-transitory computer-readable medium described herein, the received CLI reference signals may be generated based on a Zadoff-Chu sequence.

In some examples of the method, apparatuses, and non-transitory computer-readable medium described herein, the received CLI reference signals may be generated based on a Gold sequence.

In some examples of the method, apparatuses, and non-transitory computer-readable medium described herein, the CLI reference signals include uplink DMRSs, or uplink CSI-RSs, or a combination thereof.

In some examples of the method, apparatuses, and non-transitory computer-readable medium described herein, receiving the CLI reference signals in the at least one symbol period may include operations, features, means, or instructions for receiving the CLI reference signals in the at least one symbol period without corresponding uplink data.

In some examples of the method, apparatuses, and non-transitory computer-readable medium described herein, receiving the dedicated signaling may include operations, features, means, or instructions for receiving pseudo-randomly generated symbols in the at least one symbol period of the slot according to the received configuration.

In some examples of the method, apparatuses, and non-transitory computer-readable medium described herein, receiving the uplink signaling may include operations, features, means, or instructions for receiving uplink data, uplink reference signals, uplink control channel signaling, or a combination thereof, in the at least one symbol period of the slot according to the received configuration.

In some examples of the method, apparatuses, and non-transitory computer-readable medium described herein, receiving the configuration for measuring the uplink signaling may include operations, features, means, or instructions for receiving a second TDD configuration for the slot, the second TDD configuration changing an uplink transmission direction indicated by the identified TDD configuration for the at least one symbol period to a downlink transmission direction, and receiving the uplink signaling may include operations, features, means, or instructions for receiving the uplink signaling from the second wireless device in the at least one symbol period according to the downlink transmission direction.

In some examples of the method, apparatuses, and non-transitory computer-readable medium described herein, determining the CLI based on the received uplink signaling may include operations, features, means, or instructions for measuring a signal strength of the received uplink signaling to determine a CLI value.

Some examples of the method, apparatuses, and non-transitory computer-readable medium described herein may further include operations, features, means, or instructions for discarding the determined CLI value based on the measured signal strength being less than or equal to a signal strength threshold.

Some examples of the method, apparatuses, and non-transitory computer-readable medium described herein may further include operations, features, means, or instructions for determining that the determined CLI value may be valid based on the measured signal strength being greater than or equal to a signal strength threshold.

Some examples of the method, apparatuses, and non-transitory computer-readable medium described herein may further include operations, features, means, or instructions for identifying one or more timing offsets for a measurement window for receiving the uplink signaling from the second wireless device, where the CLI may be determined based on the received dedicated uplink signaling for the measurement window.

In some examples of the method, apparatuses, and non-transitory computer-readable medium described herein, a first of the one or more timing offsets may be configured at the beginning of the measurement window, or a second of the one or more timing offsets may be configured at the end of the measurement window, or a combination thereof.

In some examples of the method, apparatuses, and non-transitory computer-readable medium described herein, the measurement window spans one or more downlink symbols of the identified TDD configuration.

Some examples of the method, apparatuses, and non-transitory computer-readable medium described herein may further include operations, features, means, or instructions for receiving RRC signaling, or DCI, or a combination thereof, indicating the one or more timing offsets.

In some examples of the method, apparatuses, and non-transitory computer-readable medium described herein, receiving the configuration for measuring the uplink signaling further may include operations, features, means, or instructions for receiving the configuration in RRC signaling or DCI.

In some examples of the method, apparatuses, and non-transitory computer-readable medium described herein, the DCI provides a dynamic data channel configuration.

In some examples of the method, apparatuses, and non-transitory computer-readable medium described herein, the DCI provides a semi-persistent data channel configuration.

In some examples of the method, apparatuses, and non-transitory computer-readable medium described herein, the RRC signaling provides a periodic data channel configuration.

In some examples of the method, apparatuses, and non-transitory computer-readable medium described herein, the second wireless device and the first wireless device may be associated with a same cell of a base station.

In some examples of the method, apparatuses, and non-transitory computer-readable medium described herein, the second wireless device may be associated with a first cell served by a base station, and the first wireless device may be associated with a second cell served by the base station.

In some examples of the method, apparatuses, and non-transitory computer-readable medium described herein, the second wireless device may be associated with a first cell served by a first base station, and the first wireless device may be associated with a second cell served by a second base station.

BRIEF DESCRIPTION OF THE DRAWINGS

FIG. 5 illustrates an example of a multiple transmitter configuration that supports CLI measurement transmission schemes in accordance with aspects of the present disclosure.

DETAILED DESCRIPTION

Figure 1:
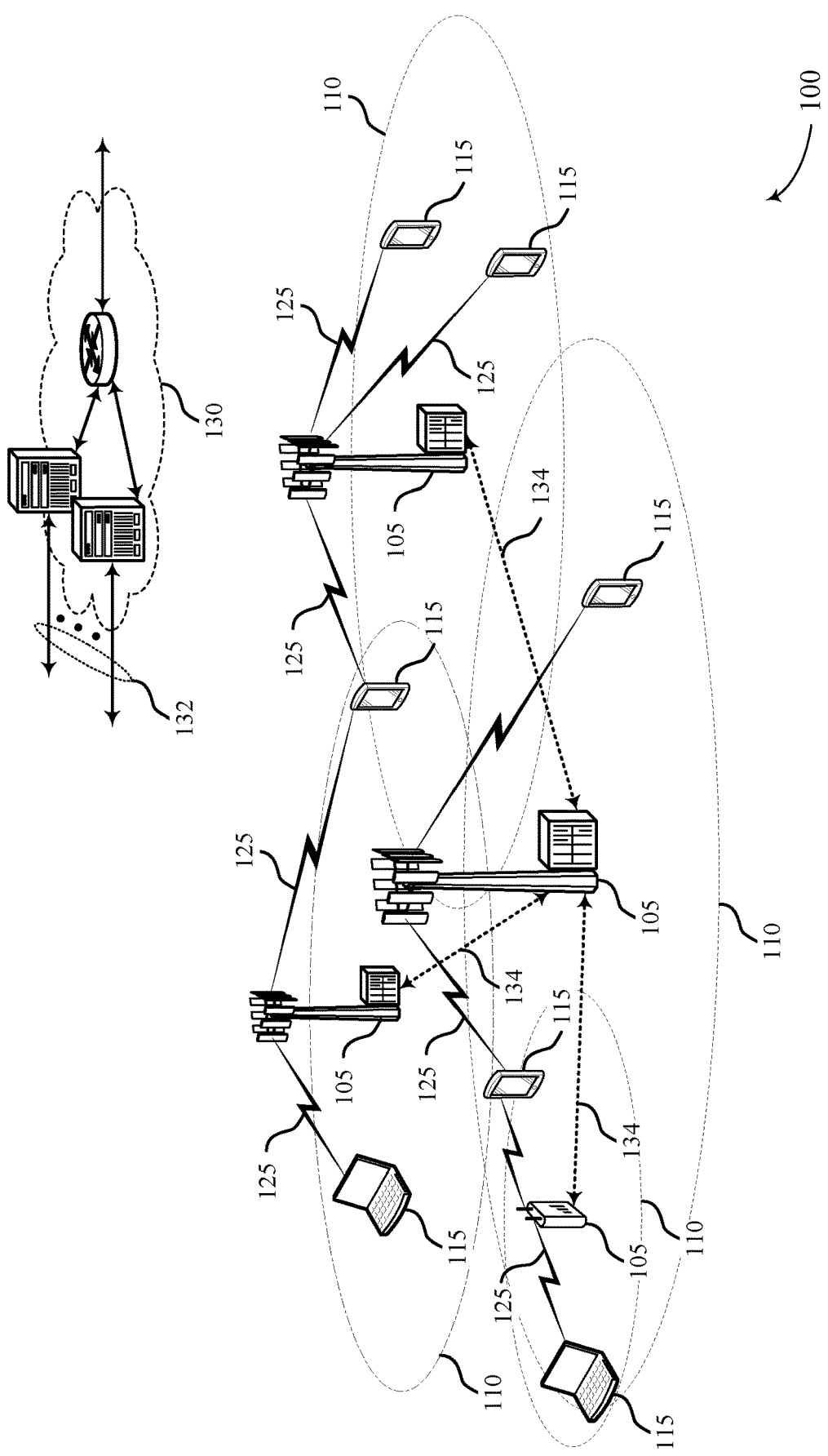
FIG. 1 illustrates an example of a system for wireless communications that supports cross-link interference (CLI) measurement transmission schemes in accordance with aspects of the present disclosure.

A wireless communications system may employ time division duplexing (TDD) techniques for communications, where a wireless channel is used for both uplink transmissions and downlink transmissions. In a TDD system with macro cells which provide a wide coverage area, the macro cells may often use the same TDD uplink/downlink configuration. For example, multiple macro cells may use the same slot format which provides, on average, the largest throughput for the large number of users connected to the macro cells. For small cells (e.g., with a cell radius of a few hundred meters), TDD uplink/downlink configurations may dynamically change to follow a change of traffic. For example, if the traffic in a small cell shifts toward being more uplink-heavy, the TDD configuration of the small cell may change to using slots which have more uplink symbol periods, and corresponding fewer downlink symbol periods. The TDD configuration of the small cell may be dynamically indicated to user equipments (UEs) in the small cell by a slot format indicator (SFI) in downlink control information. Additionally, or alternatively, the TDD configuration of the small cell may be semi-statically configured (e.g., included in an RRC configuration) by higher layer signaling, such as radio resource control (RRC) signaling, or through downlink control information.

In some cases, neighboring cells may use different TDD configurations, which can lead to conflicting symbol periods. For example, a symbol period of a first cell may be configured for downlink, where the same symbol period is configured for uplink in a second cell. If a first UE in a first cell is configured for uplink transmission during a symbol period, a second UE in a second cell is configured to receive a downlink transmission during the symbol period, and the first UE and the second UE are in close proximity, the uplink transmission of the first UE may cause interference to reception of the downlink transmission at the second UE. This type of interference may be referred to cross-link interference (CLI). Generally, differing TDD configurations may result in UE-to-UE CLI when an uplink symbol of one cell collides with a downlink symbol of a nearby cell. In some cases, CLI may occur near or between cell edge UEs of nearby cells.

To manage CLI in the wireless communications system, a first UE which is scheduled to cause UE-to-UE CLI (e.g., an aggressor UE) with an uplink transmission in one or more symbol periods may be configured to transmit uplink signaling during the one or more symbol periods. A second UE, which would be the victim of the UE-to-UE CLI (e.g., a victim UE), may be configured to receive and measure the uplink signaling during the one or more symbol periods. The second UE may provide a measurement report to its serving cell to assist the network in determining an appropriate tolerance or mitigation action for the UE-to-UE CLI. In some cases, the uplink signaling may be dedicated signaling that the first UE transmits during uplink symbols of its TDD configuration for communicating with the first cell. For example, the dedicated signaling may include uplink data, uplink reference signals, uplink control channel signaling, CLI reference signals (e.g., reference signals configured for measurement to determine CLI such as uplink demodulation reference signals (DMRSs), uplink channel state information reference signal (CSI-RS)), randomly or pseudo-randomly generated symbols or a combination thereof that the second UE uses in its CLI measurement. Additionally or alternatively, the second UE may measure the CLI based on the first UE receiving a second TDD configuration for its communications with the first cell that changes a downlink symbol to an uplink symbol, the second UE receiving a second TDD configuration for its communications with the second cell that changes an uplink symbol to a downlink symbol, or a combination thereof. In some cases, the CLI may be measured based on a signal strength (e.g., reference signal received power (RSRP), received signal strength indication (RSSI)) of the uplink signaling.

Aspects of the disclosure are initially described in the context of a wireless communications system. Additionally, aspects of the disclosure are illustrated by an additional wireless communications system, uplink-downlink TDD configurations, CLI measurement transmission schemes, a multiple transmitter configuration, a TA configuration, a timing offset, an uplink TA, and a process flow. Aspects of the disclosure are further illustrated by and described with reference to apparatus diagrams, system diagrams, and flowcharts that relate to CLI measurement transmission schemes.

FIG. 1 illustrates an example of a wireless communications system 100 that supports cross-link interference measurement transmission schemes in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30$, 720,000 seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples, (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, the wireless communications system 100 may use TDD communications, where each base station 105 providing a cell may use a different TDD configuration. In some cases, neighboring cells using different slot formats can lead to conflicting transmission directions in one or more symbol periods. For example, a symbol period of a first cell may be configured for uplink transmissions for a first UE 115, where the same symbol period is configured for downlink transmissions in a second, neighboring cell for a second UE 115. If a first UE 115 and a second UE 115 are in close proximity, the uplink transmission of the first UE 115 may cause interference to reception of the downlink transmission at the second UE 115, which may be referred to as CLI.

To manage CLI in the wireless communications system, the first UE 115 (e.g., the aggressor UE 115) may be configured to transmit uplink signaling during one or more symbol periods. The second UE 115 (e.g., the victim UE 115) may be configured to receive and measure the uplink signaling during those symbol periods. The second UE 115 may provide a measurement report to its serving cell to assist the network in determining an appropriate tolerance or mitigation action for the UE-to-UE CLI. A first base station 105 associated with the first cell may configure the first UE 115 to transmit the uplink signaling during the uplink symbol periods of a slot which may cause CLI. A second base station 105 associated with the second cell may configure the second UE 115 to receive and measure the uplink signaling during the corresponding downlink symbol periods of the slot. In some cases, the uplink signaling may be dedicated signaling that enables the second UE 115 to measure the CLI. For example, the dedicated signaling may include uplink data, CLI reference signals (e.g., uplink DMRS, uplink CSI-RS), random or pseudo-randomly generated uplink symbols, or a combination thereof.

Figure 2:
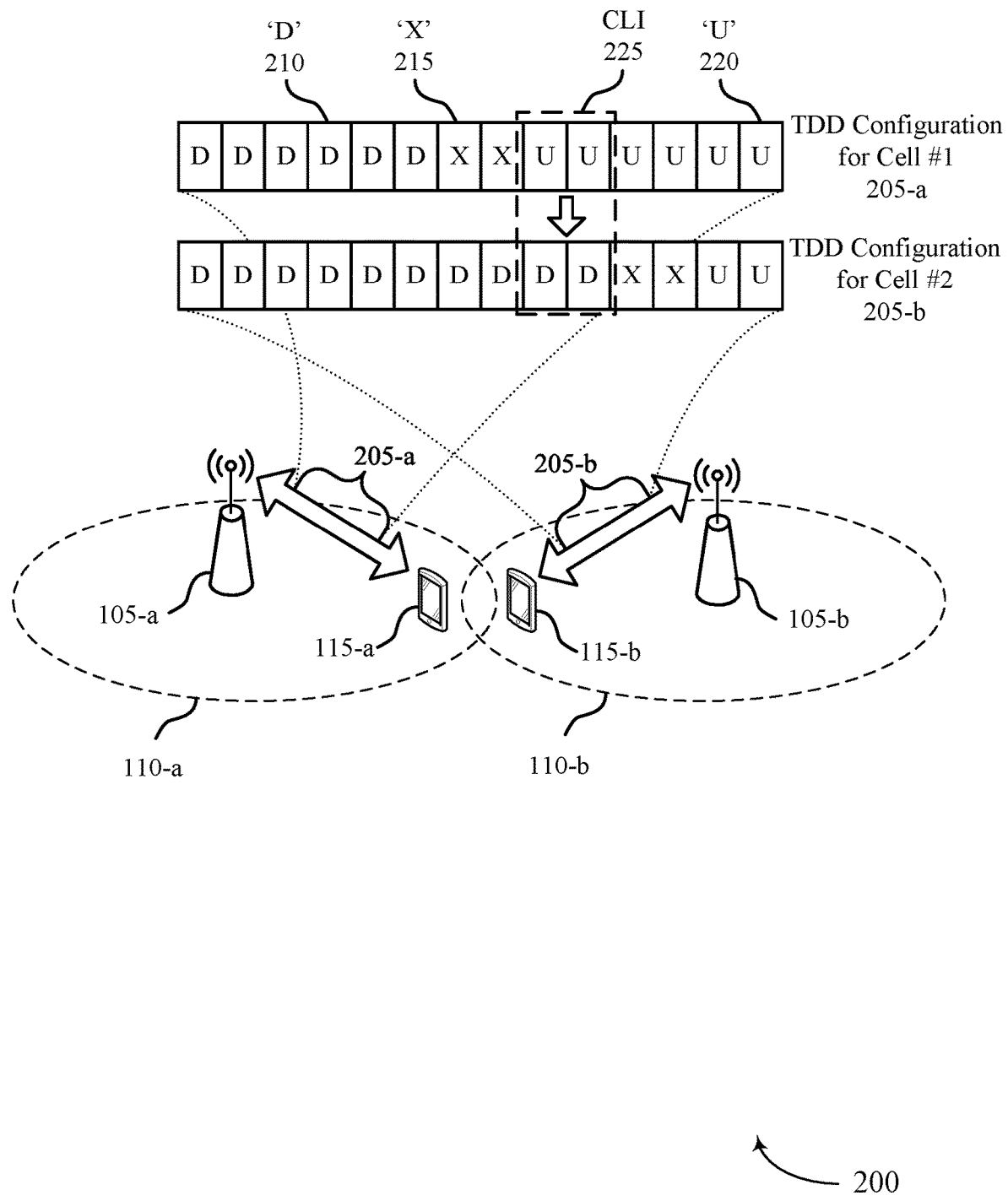
FIG. 2 illustrates an example of a wireless communications system that supports CLI measurement transmission schemes in accordance with aspects of the present disclosure.

FIG. 2 illustrates an example of a wireless communications system 200 that supports CLI measurement transmission schemes in accordance with aspects of the present disclosure. In some examples, wireless communications system 200 may implement aspects of wireless communications system 100. The wireless communications system 200 may include a UE 115-a and a UE 115-b, which may be examples of a UE 115 as described herein. The wireless communications system 200 may also include a base station 105-a and a base station 105-b, which may be examples of a base station 105 as described herein. Base station 105-a and base station 105-b may each be an example of a small cell. The base stations 105 may each be associated with a cell which provides wireless communications with the base station 105 within a coverage area 110.

The wireless communications system 200 may employ TDD communications, where a wireless communications channel is used for both uplink transmissions and downlink transmissions. Each cell may configure a TDD configuration 205 for the cell. For example, the first cell of base station 105-a may use a first TDD configuration 205-a, and the second cell of base station 105-b may use a second TDD configuration 205-b. UEs 115 in these cells may communicate with the base station 105 providing the cell based on the corresponding TDD configuration 205. For example, a slot of a TDD configuration 205 may include symbol periods for downlink symbols 210, flexible symbols 215, or uplink symbols 220, or any combination thereof. The base station 105 may transmit downlink in a downlink symbol 210, and the UE 115 may transmit an uplink transmission in an uplink symbol 220. Flexible symbols 215 may, in some cases, be used as guard periods between the uplink transmissions and downlink transmissions. A guard period may prevent inter-symbol interference or may provide time for a UE 115 to adjust radio frequency hardware. In some cases, a flexible symbol 215 may be dynamically reconfigured to either a downlink symbol 210 or an uplink symbol 220.

The base stations 105 may dynamically change the TDD configurations 205. In an example, the traffic in the first cell may shifts toward being more uplink-heavy, so the first TDD configuration 205-a of the first cell may change to using a slot configuration which has more uplink symbol periods. In some cases, a TDD configuration 205 may be dynamically indicated to UEs in the cell by an SFI in downlink control information (DCI). The DCI conveying the SFI may be transmitted in one of the first few downlink symbols 210 of the slot. Additionally, or alternatively, the TDD configuration 250 may be semi-statically configured (e.g., included in an RRC configuration) by higher layer signaling, such as RRC signaling.

In some cases, different TDD configurations 205 used by neighboring cells may lead to conflicting transmission directions for some symbol periods of a slot. For example, the 9th and 10th symbol periods of the slot shown may have conflicting directions for the first TDD configuration 205-a and the second TDD configuration 205-b. TDD configuration 205-a may have uplink symbols 220 configured when TDD configuration 205-b has downlink symbols 210 configured. Therefore, UE 115-a in the first cell may be configured to transmit an uplink transmission while UE 115-b in the second cell is configured to receive a downlink transmission. The first cell and the second cell may be neighboring cells, and UE 115-b and UE 115-a may be near each other at the edge of their respective cell. In some cases, the uplink transmission of UE 115-a may cause interference to reception of the downlink transmission at UE 115-b. This type of interference may be referred to UE-to-UE CLI, shown by CLI 225 at the conflicting symbol periods. Generally, differing TDD configurations 205 may result in UE-to-UE CLI 225 when an uplink symbol of one cell collides with a downlink symbol of another nearby cell. CLI 225 may occur near or between cell edge UEs of nearby cells. The UE 115 transmitting the uplink signal (e.g., UE 115-a here) may be referred to as the aggressor UE 115, and the UE 115 which is receiving the affected downlink transmission (e.g., UE 115-b here) may be referred to as the victim UE 115.

For interference management (e.g., whether more or less interference is allowed), a strength of CLI 225 may be measured by the UEs 115 involved in CLI 225 (e.g., UE 115-a and UE 115-b). In some cases, RSRP and RSSI may be identified as the measurement metrics for CLI 225. RSRP may indicate the received reference signal power of a configured reference signal resource for measuring CLI 225. For example, one of the UEs 115 may demodulate a reference signal, perform a channel estimation on the demodulated signal, and measure the RSRP based on the channel estimation. RSSI may indicate a total received power from all signals that a UE 115 receives (e.g., from adjacent channels, other cells, its own cell) and may be measured in some OFDM symbols (e.g., the symbols where the CLI is present).

The strength of CLI 225 may be measured in one or more ways. Victim UEs 115 (e.g., UE 115-b) may measure signals transmitted from the aggressor UEs 115 (e.g., UE 115-a). Additionally or alternatively, aggressor UEs 115 may measure signals transmitted from victim UEs 115. Due to a channel reciprocity of the TDD configurations and channel, the measurement made by the aggressor UEs 115 may reflect the aggressor-to-victim interference strength (e.g., the interference at the victim UEs 115 may be reciprocally determined from the measurement at the aggressor UE 115). In some cases, these measurements for the strength of CLI 225 may be performed at different levels. For example, the strength measurement of CLI 225 may be cell-specific (e.g., all UEs 115 in a cell transmit the signals for the measurement), group-specific (e.g., a subset of UEs 115 in a cell transmit the signals for the measurement), or UE-specific (e.g., one UE 115 in the cell transmits the signals for the measurement). This may provide different levels of granularity for determining CLI strength, tolerance, and impact.

To enable a strength measurement of CLI 225 (e.g., RSSI) in the wireless communications system 200 between two UEs 115 (e.g., UE 115-a and UE 115-b), one UE 115 may transmit an uplink signal in an uplink symbol 220, where this symbol corresponds to a downlink symbol 210 at another UE 115. For example, UE 115-a may transmit an uplink signal in the 9th and 10 symbol periods of the slot, while UE 115-b is configured to receive downlink signals in the same of 9th and 10th symbol periods of the slot. In some cases, a symbol may be configured as a flexible symbol 215, but converted to an uplink symbol 220 or downlink symbol 210 if transmission or reception, respectively, of a channel or signals is configured to a UE 115 in the flexible symbol 215.

To ensure that the proper symbol types are present for enabling the strength measurement of CLI 225 between the two UEs 115, a slot format for one or both UEs 115 may be explicitly configured to include the proper symbol types or uplink signaling may be configured to be transmitted in the appropriate symbols. For example, UE 115-a, UE 115-b, or both may receive additional TDD configurations different than the TDD configurations 205 shown in wireless communications system 200 (e.g., dynamic TDD configurations for data traffic) that change downlink symbols 210 to uplink symbols 220 or uplink symbols 220 to downlink symbols 210. Accordingly, UE 115-b may then measure the strength of CLI 225 on the changed symbols. Additionally or alternatively, the strength measurement of CLI 225 may rely on the TDD configurations 205 for each cell (e.g., TDD uplink-downlink configurations) for data traffic. For example, UE 115-a may transmit uplink signaling in the interfering symbols (e.g., uplink symbols 220 in the 9th and 10th symbol periods) of an uplink-downlink configuration for dynamic TDD traffic (e.g., TDD configuration 205-a). UE 115-b (e.g., or additional other UEs 115 in other cells) may perform measurement of CLI 225 in the corresponding interfered symbols (e.g., downlink symbols 210 in the 9th and 10th) of the uplink-downlink configuration for dynamic TDD traffic (e.g., TDD configuration 205-b).

The network may use the strength measurement to determine whether the UE-to-UE CLI 225 is causing too much performance degradation at UE 115-b or whether UE 115-b can handle more interference. In some cases, the network may determine that UE 115-b can handle more interference from the CLI 225 and implement more aggressive TDD configurations 205 for one or both of the cells. The more aggressive TDD configurations 205 may introduce more overlapping symbols and more CLI 225, but possibly higher throughput. In some cases, the network may determine that the interference from the CLI 225 affects the downlink reception at UE 115-*b* too much, and the network may implement less aggressive TDD configurations 205 for one or both of the cells. The less aggressive TDD configurations 205 may reduce the number of overlapping symbols and reduce the UE-to-UE CLI 225, which may improve channel conditions for the victim UE 115. In some examples, the determinations may be based on a threshold or a tolerance. For example, if the channel quality, RSRP, RSSI, or another measurement metric, at the victim UE 115 is below a threshold, the serving cell of the victim UE 115 may implement a less aggressive TDD configuration 205. In some cases, one or more of the base stations 105 may make the determination of whether to use a more aggressive or less aggressive TDD configuration 205. Additionally, or alternatively, a control unit (CU), a gNB, or some other entity may make the determination for the one or more TDD configurations 205 based on the measurements.

While it is shown in FIG. 2 that each UE 115-*a* and UE 115-*b* are connected to a first and second cell with corresponding base stations 105-*a* and 105-*b*, respectively, different scenarios may exist where uplink transmissions from UE 115-*a* may cause CLI on downlink transmissions received by UE 115-*b*. The various techniques described herein may also be applied for other UE to base station connection scenarios. For example, UE 115-*a* and UE 115-*b* may be connected to a first cell and a second cell, respectively, but both cells may be associated with (e.g., served be) a same base station 105. Additionally or alternatively, UE 115-*a* and UE 115-*b* may be connected to the same cell served by the same base station 105, but UE 115-*a* and UE 115-*b* may have different (e.g., UE-specific TDD configurations 205 that result in the CLI among each other while being connected to the same cell.

Figure 3A:
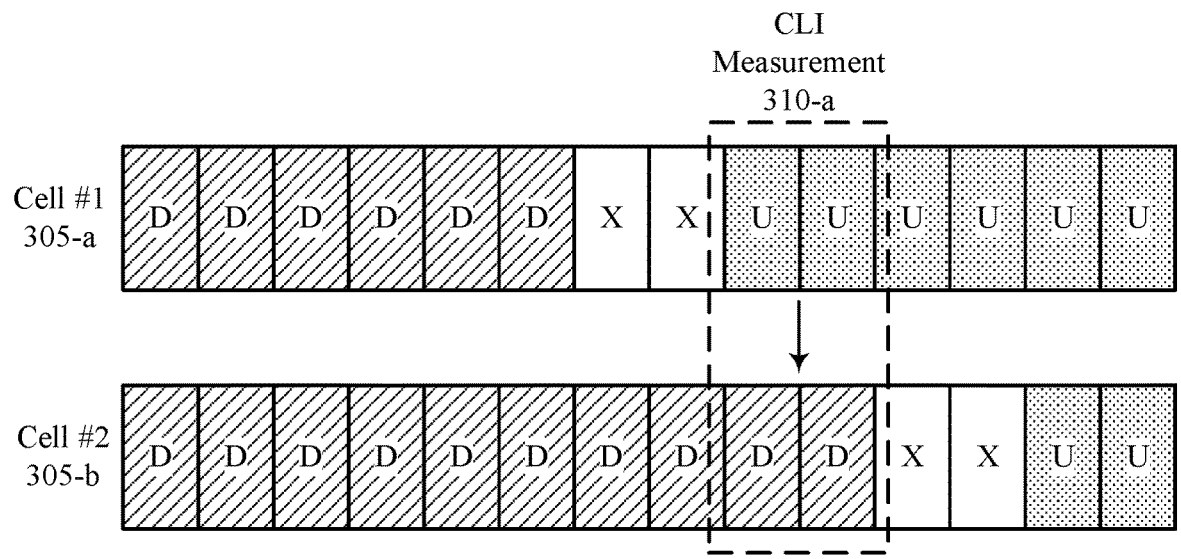
FIGS. 3A and 3B illustrate examples of uplink-downlink time division duplexing (TDD) configurations that support CLI measurement transmission schemes in accordance with aspects of the present disclosure.
Figure 3B:
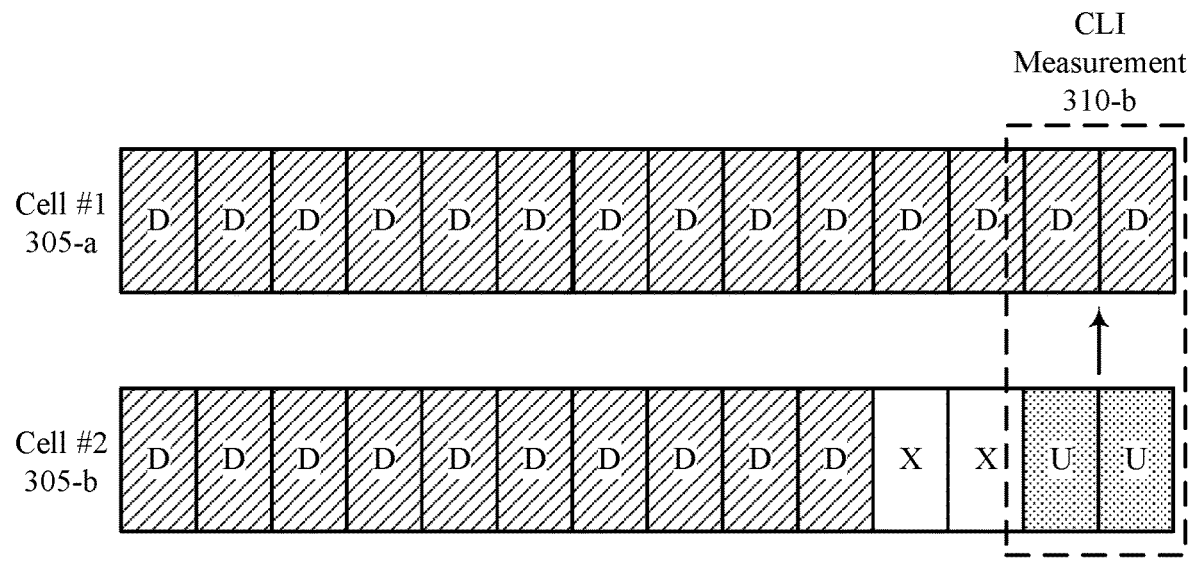

FIGS. 3A and 3B illustrate examples of uplink-downlink TDD configurations 300 and 301 that supports CLI measurement transmission schemes in accordance with aspects of the present disclosure. In some examples, uplink-downlink TDD configurations 300 and 301 may implement aspects of wireless communications systems 100 or 200. Uplink-downlink TDD configurations 300 and 301 may include TDD configurations for a first cell 305-*a* and a second cell 305-*b*. UEs 115 connected to each cell 305 may receive a corresponding TDD configuration for subsequent communications with their cell 305. The TDD configurations may include one or more downlink symbols 315, flexible symbols 320, and uplink symbols 325.

For uplink-downlink TDD configuration 300, UEs 115 connected to the first cell 305-*a* may be aggressor UEs 115 to UEs 115 connected to the second cell 305-*b*, which may be referred to as victim UEs 115. Accordingly, uplink-downlink TDD configuration 300 may illustrate an aggressor-victim relationship between two cells 305 (e.g., the first cell 305-*a* and the second cell 305-*b*) due to an uplink/downlink symbol conflict in their uplink-downlink configurations for dynamic TDD data transmission. For example, both cells 305 may be initially configured with uplink-downlink configurations for dynamic TDD traffic. As such, victim UEs 115 in the second cell 305-*b* may perform a CLI measurement 310-*a* on uplink data transmitted by aggressor UEs 115 in the first cell 305-*a*. However, in some cases, while aggressor UEs 115 in the first cell 305-*a* are scheduled for uplink transmissions in the interfering uplink symbols 325, there may not be any uplink information or data to be transmitted in the interfering uplink symbols 325, which may affect the CLI measurement 310-*a*.

One implementation to overcome the absence of uplink information or data and to enable a CLI measurement is indicated by uplink-downlink TDD configuration 301. As shown, one or more UEs 115 in the first cell 305-*a* may receive a second TDD configuration different than the uplink-downlink configuration for dynamic TDD for data traffic as shown in FIG. 3A. For example, a base station 105 associated with the first cell 305-*a* may explicitly configure a slot format that includes symbol types for aggressor UEs 115 of the first cell 305-*a* or victim UEs 115 of the second cell 305-*b* to transmit or receive signaling to perform a CLI measurement 310.

Accordingly, this implementation may allow a CLI measurement 310-*b* at an aggressor UE 115 of the first cell 305-*a* that otherwise cannot perform a strength measurement (e.g., RSSI) of signals from a victim UE 115 in the second cell 305-*b*. For example, the first cell 305-*a* may be configured with a separate slot format that contains downlink symbols 315 colliding with uplink symbols 325 of the TDD configuration for the second cell 305-*b*, and UEs 115 of the first cell 305-*a* may perform the CLI measurement 310-*b*. In some cases, this new slot format may be configured with a low density to avoid distortion to a regular traffic pattern.

Additionally or alternatively, while the first cell 305-*a* is reconfigured as shown in FIG. 3B with respect to the initial TDD configurations as shown in FIG. 3A, both cells may be configured (e.g., reconfigured) with separate slot formats to enable the CLI measurement 310-*b* between them. For example, the network may configure one or both sides of a CLI link between cells 305 that are involved in the CLI. These configurations may include changing downlink symbols 315 of initial TDD configurations for data traffic to uplink symbols 325, uplink symbols 325 of the initial TDD configurations for data traffic to downlink symbols 315, flexible symbols 320 to either downlink symbols 315 or uplink symbols 325, or a combination thereof. In some cases, the aggressor UEs 115, the victim UEs 115, or both may receive different TDD configurations than their initial TDD configurations to enable the CLI measurement 310. As shown, the first cell 305-*a* may include an initial TDD configuration as shown in FIG. 3A with a symbol pattern that includes uplink, downlink, or flexible symbols, but then may indicate a second TDD configuration as shown in FIG. 3B with a symbol pattern that includes downlink symbols across an entire slot. The change in the symbol pattern may enable UEs 115 on the first cell 305-*a* to measure a CLI on the last two symbols of the slot, where UEs 115 on the second cell 305-*b* are scheduled for uplink transmissions. Both the initial TDD configurations and second TDD configurations may be signaled by the cells 305 via RRC signaling (e.g., periodic or semi-static signaling), DCI messaging (e.g., semi-persistent or dynamic signaling), or a combination thereof.

Figure 4A:
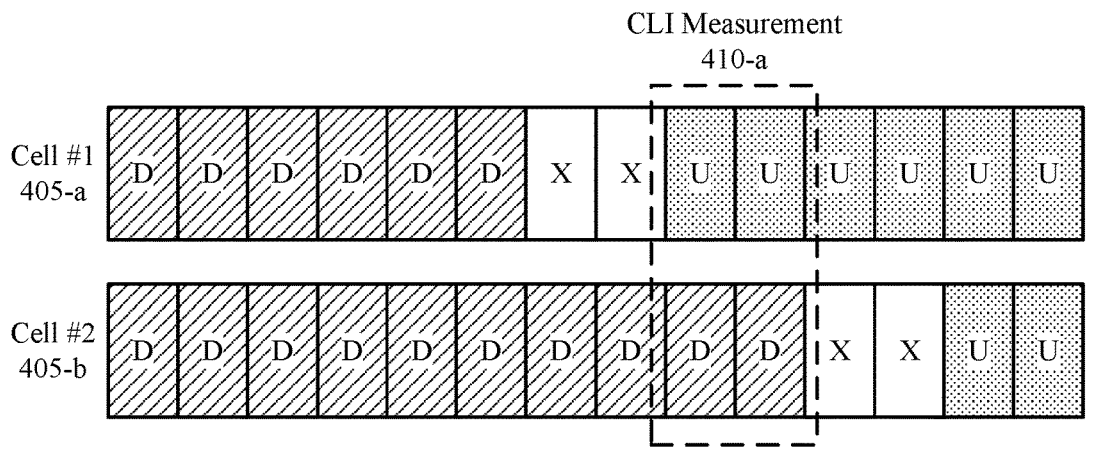
FIGS. 4A, 4B, and 4C illustrate examples of CLI measurement transmission schemes in accordance with aspects of the present disclosure.
Figure 4B:
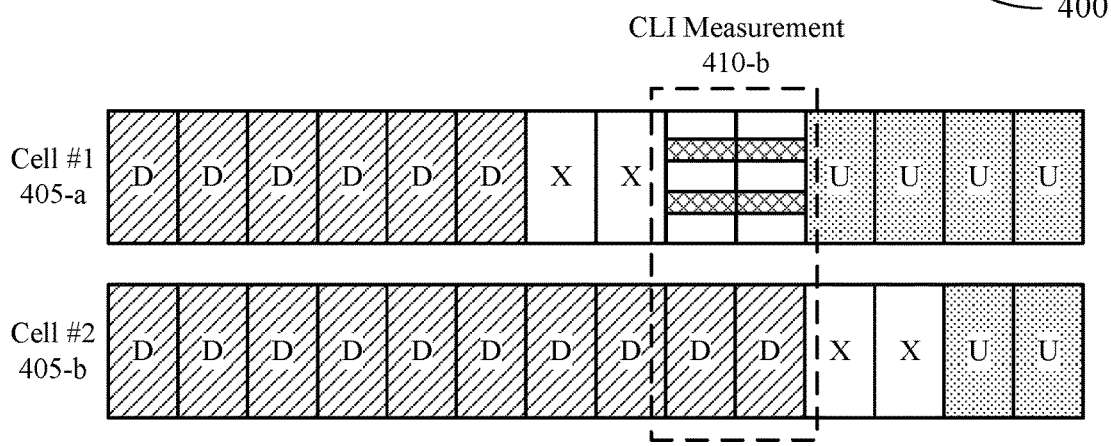
Figure 4C:
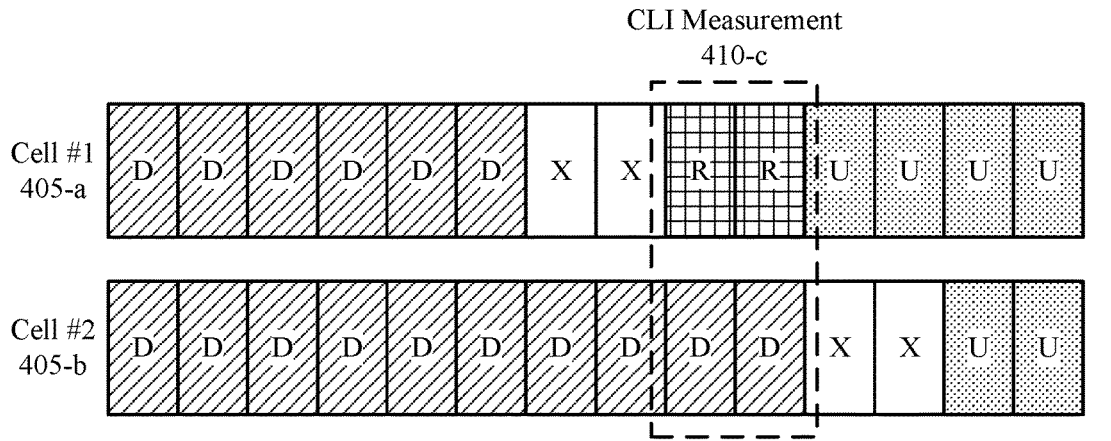

FIGS. 4A, 4B, and 4C illustrate examples of CLI measurement transmission schemes 400, 401, and 402 in accordance with aspects of the present disclosure. In some examples, CLI measurement transmission schemes 400, 401, and 402 may implement aspects of wireless communications systems 100 or 200. CLI measurement transmission schemes 400, 401, and 402 may include TDD configurations for a first cell 405-*a* and a second cell 405-*b*. UEs 115 connected to each cell 405 may receive a corresponding TDD configuration for subsequent communications with their cell 405. The TDD configurations may include one or more downlink symbols 415, flexible symbols 420, and uplink symbols 425. A CLI measurement 410 (e.g., signal strength measurement, RSSI measurement) may be based on signals (e.g., uplink signals, dedicated signals) transmitted in one or more uplink symbols 425 from UEs 115 in the first cell 405-*a* that correspond to downlink symbols 415 in the second cell 405-*b* (e.g., another cell), where the signals transmitted in the one or more uplink symbols 425 may include regular uplink data, CLI reference signals (e.g., uplink DMRS, uplink CSI-RS, sounding reference signal (SRS)), or random data (e.g., pseudo-randomly generated uplink symbols).

CLI measurement transmission scheme 400 may illustrate a CLI measurement 410-*a* based on regular uplink transmissions (e.g., uplink transmissions schedule by cell 405-*a* for transmission to cell 405-*a*, and not otherwise configured for CLI measurement). The UE-to-UE CLI (e.g., where the CLI measurement 410-*a* is being performed) may be caused by uplink transmissions from an aggressor UE from the first cell 405-*a* in uplink symbols 425 that collide with downlink data received in downlink symbols 415 at a victim UE 115 of the second cell 405-*b*. Accordingly, the regular uplink transmissions may be used for the CLI measurement 410-*a*. The regular uplink transmissions may include uplink data, uplink reference signals, uplink control channel signaling, or a combination thereof. However, in some cases, an uplink symbol transmission may not be available from the aggressor UE 115 for the victim UE 115 to measure. Additionally or alternatively, there may be no uplink data to transmit from the aggressor UE 115 (e.g., transmitter UE 115), preventing the victim UEs 115 from performing the CLI measurement 410-*a*. In some cases, the uplink transmission may not be scheduled across the full bandwidth of the uplink symbols 425 where the CLI measurement 410-*a* is performed, affecting the accuracy of the measurement.

Additionally, when uplink symbol transmissions are not available from any aggressor UE 115 for a victim UE 115 to measure, the victim UE 115 may be unable to measure the CLI from the aggressor UE 115 or the measurement may be compromised. As a result, the CLI measurement may be lower than normal and biased. To mitigate this bias, a predetermined threshold value for a signal strength according to the CLI measurement may be configured. Accordingly, if a physical layer measurement that corresponds to the CLI measurement (e.g., RSSI) is below the predetermined threshold value, the victim UE 115 may discard the measurement results. Alternatively, if the physical layer measurement is above the predetermined threshold value, the victim UE 115 may determine the measurement result is valid. For example, if different layer filtering (e.g., Layer-3 filtering) is enabled for the CLI measurement, the valid measurement results may be used for the layer filtering input. Additionally, the victim UE 115 may adapt a filter coefficient for the layer filtering such that time characteristics of the filter are preserved even if some of the physical layer measurements are discarded before filtering. By adapting the filter coefficient, the victim UE 115 may keep track of the variation of the signal strength for the CLI measurement (e.g., RSSI) over time.

CLI measurement transmission scheme 401 may illustrate a CLI measurement 410-*b* based on transmissions of one or more CLI reference signals 430 (e.g., dedicated signaling for CLI measurements). In some cases, the CLI reference signals 430 may include SRS, uplink DMRS, uplink CSI-RS, or other reference signals used to enable the CLI measurement 410-*b* at a victim UE 115. At the victim UE 115 (e.g., a receiving UE 115), a reference signal configuration can be provided by the network that corresponds to the transmitted CLI reference signal 430 from an aggressor UE 115. The victim UE 115 uses this configuration to process the CLI reference signal 430 and generate a result for the CLI measurement 410-*b*. In some cases, the CLI reference signal(s) 430 may be generated based on a Zadoff-Chu sequence, a Gold sequence, or a similar coding sequence.

Additionally, the CLI reference signals 430 may be transmitted without corresponding uplink data in the respective uplink symbols 425. For example, the CLI reference signals 430 may be transmitted without associated uplink data whose demodulation may indicate the transmission of the CLI reference signals 430 (e.g., where the transmission of the CLI reference signals 430 is mandatory based on the demodulation). In some cases, the CLI reference signals 430 may include uplink DMRSs as described herein, where DMRS is embedded in uplink data transmissions of uplink channels. However, when there is no uplink data available to transmit, a DMRS-specific transmission for the CLI measurement 410-*b* may be configured for the aggressor UE 115. For example, an additional field may be included in a physical uplink shared channel (PUSCH) configuration to schedule a DMRS transmission (e.g., or CLI reference signal 430 transmission) in symbols and RBs without uplink data. An indication that the CLI reference signal 430 is to be transmitted alone without uplink data by the aggressor UE 115 may be included in RRC signaling or a DCI message. For example, the indication may be included in an RRC semi-static configuration for a PUSCH (e.g., a periodic configuration), a dynamic PUSCH configuration by a DCI message in a physical downlink control channel (PDCCH) (e.g., a dynamic configuration), a DCI for activation of a semi-persistent scheduled (SPS) PUSCH (e.g., a semi-persistent configuration). In some cases, a new field may be added to a DCI for dynamic uplink scheduling or SPS activation (e.g., a configured grant) of an uplink CLI reference signal 430 transmission. In some cases, the CLI reference signals 430 may include an uplink CSI-RS as described herein. Accordingly, configuration of the uplink CSI-RS may be included in an RRC semi-static configuration for a periodic CSI-RS transmission, in a dynamic configuration by a DCI message in a PDCCH, or in a DCI for activation of an SPS uplink CSI-RS transmission. Additionally, the network may use configuration fields in downlink messages to the aggressor UE 115 to configure resources, ports, precoding schemes, transmission power, etc., for the CLI reference signal 430 (e.g., DMRS, CSI-RS) transmission.

When the CLI reference signals 430 are transmitted by an aggressor UE 115 that is capable of transmission in multiple uplink beams, the aggressor UE 115 may transmit the CLI reference signals 430 in one uplink beam or multiple uplink beams. Accordingly, if a CLI reference signal 430 is transmitted in one uplink beam, the one uplink beam may be the serving beam for the aggressor UE 115. In some cases, this serving beam may be a most recently used uplink beam by the aggressor UE 115 or a currently active uplink beam. Additionally or alternatively, if a CLI reference signal 430 is transmitted in multiple uplink beams, the transmission may follow a time domain pattern for all of the multiple uplink beams or for a subset of all of the multiple uplink beams. The time domain patterns may include a sequence of uplink symbols where one uplink beam of the multiple uplink beams is activated in each symbol.

Additionally, when the CLI reference signal 430 is transmitted by an aggressor UE 115 that has multiple uplink transmit ports, the aggressor UE 115 may transmit the CLI reference signal 430 from one uplink port or multiple uplink ports. For example, if a CLI reference signal 430 is transmitted from one uplink port, the one uplink port (e.g., a transmit port) may correspond to a first port associated with the corresponding type of reference signal. Additionally or alternatively, when a CLI reference signal 430 is transmitted from multiple uplink ports, the aggressor UE 115 may apply a precoding matrix to the CLI reference signal 430 that is the same as a serving precoding matrix. This serving precoding matrix may be a most recent (e.g., an uplink precoding matrix previously used if no concurrent PUSCH is scheduled) or a currently used uplink precoding matrix for PUSCH.

CLI measurement transmission scheme 402 may illustrate a CLI measurement 410-c based on transmissions of one or more random data symbols 435 (e.g., pseudo-randomly generated symbols or data, random symbols or data, dedicated signaling). Such random data symbols 435 may span the resources of the associated symbol period(s), or may include a subset of the total resources available in the symbol period. The random data symbols 435 may provide an additional implementation to generate power for the CLI measurement 410-c when there is no uplink data to transmit in the interfering uplink symbols 425. A victim UE 115 may receive the random data symbols 435 from an aggressor UE 115 and perform the CLI measurement 410-c to determine the signal strength of the CLI on its downlink symbols 415.

To enable the transmission of the random data symbols 435, a PUSCH configuration may be used with an additional configuration field to indicate the random data transmission in scheduled symbols and RBs. An indication of whether random data is to be transmitted by the aggressor UE 115 may be added to an RRC configuration (e.g., a periodic configuration), a DCI message for activation of SPS (e.g., a semi-persistent configuration), or a DCI message for dynamic scheduling of a PUSCH (e.g., a dynamic configuration). For example, a new field may be added for the DCI message that schedules a PUSCH to indicate whether the aggressor UE 115 is to transmit the random data symbols 435 (e.g., "true") or not (e.g., "false"). Additionally, the network may configure resources modulation order, ports, precoding scheme, transmission power, etc., for the random data transmissions.

In some cases, data channel (i.e., PUSCH) or reference signal (i.e., downlink CSI-RS) configurations may be used to configure dedicated uplink signaling for measuring the CLI (e.g., the CLI reference signals 430, the random data symbols 435). For example, PUSCH configurations may be used to configure the CLI reference signals 430 (e.g., uplink DMRS) as the dedicated signaling for the CLI. Additionally or alternatively, a CSI-RS configuration may be used to enable the CLI reference signals 430 transmissions (e.g., uplink CSI-RS) as the dedicated signaling for the CLI. To enable a CLI reference signal 430 transmission at the aggressor UE 115 in the uplink direction, mechanisms for downlink reference signal configurations may be modified to include associated configuration fields based on uplink settings (e.g., changing the transmission direction to uplink).

FIG. 5 illustrates an example of a multiple transmitter configuration 500 that supports CLI measurement transmission schemes in accordance with aspects of the present disclosure. In some examples, multiple transmitter configuration 500 may implement aspects of wireless communications systems 100 or 200. Multiple transmitter configuration 500 may include a first cell 505-a and a second cell 505-b, which may be examples of cells as described herein. Each cell 505 may be associated with a base station 105. In some cases, although not shown, each cell 505 may be associated with a same base station 105.

As described herein, aggressor UEs 115 within each cell 505 may cause a UE-to-UE CLI to victim UEs 115 of additional cells that are within a range 510 of each cell 505. For example, uplink transmissions from aggressor UEs 115 of the first cell 505-a may affect downlink transmission receptions of victim UEs 115 of cells within a range 510-a around the first cell 505-a. Additionally, uplink transmissions from aggressor UEs 115 of the second cell 505-b may affect downlink transmission receptions of victim UEs 115 of cells within a range 510-b around the second cell 505-b.

When measuring the signal strength of a CLI (e.g., RSSI), a victim UE 115 may not be able to distinguish the strength of signals from different aggressor UEs 115 transmitting at the same time. To mitigate this indistinguishability, in a symbol where a CLI measurement is configured, the network may configure uplink transmissions from a set of aggressor UEs 115 depending on a cell-specific configuration (e.g., UEs 115 in one cell), a group-specific configuration (e.g., a subset of UEs in one cell), or a UE-specific configuration (e.g., a single UE in the cell). Additionally or alternatively, simultaneous uplink transmissions in a symbol from aggressor UEs 115 in two cells 505 may be configured if they are a threshold distance away from each other. For example, the simultaneous uplink transmissions may be configured if any third cell receives signals from UEs 115 in one of the two cells 505. As shown, the first cell 505-a and the second cell 505-b may be configured for simultaneous uplink transmissions in a same symbol because their respective ranges 510 do not overlap, such that UEs 115 in each cell of the corresponding ranges 510 may receive signals from either the first cell 505-a or the second cell 505-b, but not both.

Figure 6:
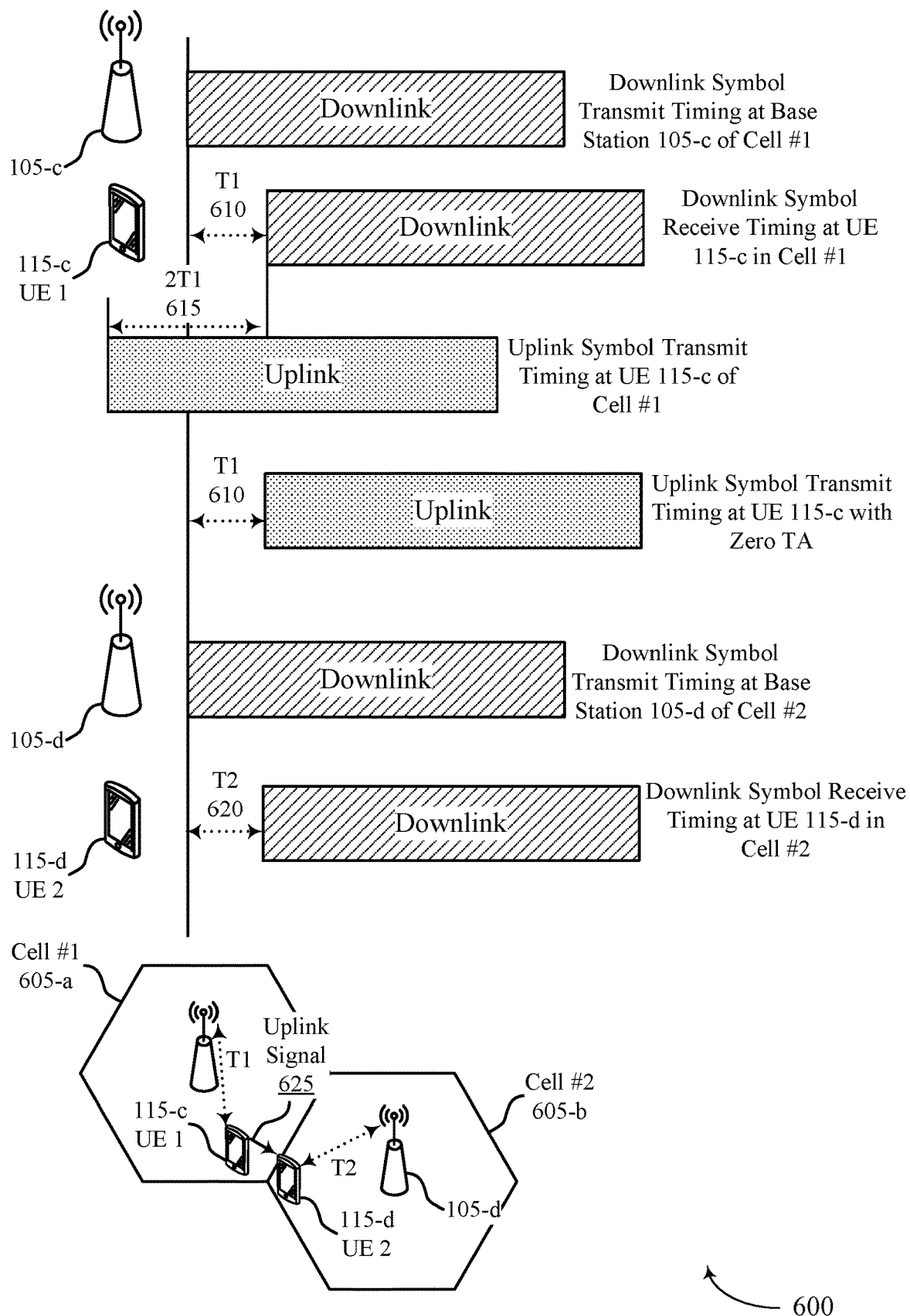
FIG. 6 illustrates an example of a timing advance (TA) configuration that supports CLI measurement transmission schemes in accordance with aspects of the present disclosure.

FIG. 6 illustrates an example of a timing advance (TA) configuration 600 that supports CLI measurement transmission schemes in accordance with aspects of the present disclosure. In some examples, TA configuration 600 may implement aspects of wireless communications systems 100 or 200. The TA configuration 600 may include UE 115-c and UE 115-d, which may be examples of UEs 115 as described herein. The TA configuration 600 also include base station 105-c and base station 105-d, which may be examples of base stations 105 as described herein. In some cases, base station 105-c and base station 105-d may each be an example of a small cell. The base stations 105 may each be associated with a cell 605 which provides wireless communications with the base station 105 within a coverage area.

As described herein, a wireless communications system may employ multiple cells 605, where each cell 605 is capable of using a different dynamic TDD configuration. A dynamic TDD configuration may include a symbol pattern for a slot, including symbol periods for downlink symbols, flexible symbols, uplink symbols, or a combination thereof, some cases, the dynamic TDD configuration for each cell 605 may be configured or selected based on traffic flow by the serving base station 105 of the cell. The serving base station 105 may then dynamically indicate the TDD configuration, including the symbol pattern (e.g., pattern of uplink, downlink, and flexible symbols), to the UEs 115 in the cell 605. In some cases, a symbol pattern for the TDD configuration for a first cell 605 may be scheduled such that CLI is caused in at least one other cell. For example, a symbol pattern for the TDD configuration of cell 605-a may be scheduled that causes UE-to-UE CLI in cell 605-b.

In some cases, the aggressor UEs 115 in the cell 605-a (e.g., UE 115-c) may be configured to transmit an uplink signal 625 using a symbol period assigned for the uplink symbols which are schedule to cause interference. The victim UEs 115 in the cell 605-b (e.g., UE 115-d) may perform a measurement based on the uplink signal 625 and report the CLI strength to base station 105-d. As described herein with reference to FIGS. 4A, 4B, and 4C, the uplink signal 625 may include uplink data (e.g., regular uplink transmissions, uplink reference signals, uplink control channel signaling), CLI reference signals (e.g., uplink DMRS, uplink CSI-RS), or random data (e.g., pseudo-randomly generated symbols).

A UE 115 transmitting an uplink signal 625 may apply a TA when transmitting the uplink signal 625. In some cases, a TA may be used to align the symbol boundary of uplink symbols from different UEs 115 that have different distances to a base station 105. A UE 115 transmitting an uplink signal 625 as described herein may also apply a TA when transmitting the uplink signal 625 for measurement by another UE 115.

In some cases, UE 115-c may apply the same TA as regular uplink transmission symbols, referred to here as an uplink TA 615. When base station 105-c transmits a downlink symbol to UE 115-c, UE 115-c may identify the duration T1 elapsed from the downlink symbol edge to when UE 115-c actually receives the downlink symbol. This elapsed time duration (T1) may correspond to a propagation delay 610 for the signal to be carried over a wireless medium from base station 105-c to UE 115-c. Thus, the propagation delay 610 may be equal to the difference between the downlink symbol transmit timing at base station 105-c and the downlink symbol receive timing at UE 115-c. The uplink TA 615 may be equal to, or subject to a constant bias, twice the propagation delay 610, or 2*T1, which may be the referred to as the round trip delay between UE 115-c and base station 105-c. Therefore, in some cases, UE 115-c may transmit the uplink signal 625 by applying the uplink TA 615. In some cases, applying the uplink TA 615 may result in inter-symbol interference at UE 115-d if the uplink signal 625 does not align with the symbol boundary of the downlink symbols of UE 115-d. However, this technique may reduce complexity for UE 115-c.

In other examples, the network may statically or dynamically configure a TA that makes the uplink signal 625 align with the downlink symbol boundary at the receivers. For example, base station 105-c may transmit a configuration to UE 115-c including a value for the timing advance to use for the uplink signal 625.

In some cases, base station 105-c may configure UEs 115 in cell 605-a (e.g., including UE 115-c) to apply a zero-valued timing advance to the uplink signal 625. When applying a zero-valued timing advance, an aggressor UE 115 transmitting an uplink signal 625, such as UE 115-c, may not modify the starting transmission time of the uplink signal 625. For example, the timing advance may be equal to zero, such that UE 115-c transmits the uplink signal 625 approximately at the perceived start of its downlink symbol boundary. In some cases, if the uplink symbol carrying the uplink signal 625 collides with a subsequent uplink symbol at UE 115-c, UE 115-c may drop the transmission on the subsequent uplink symbol (e.g., to transmit the uplink signal 625 instead).

In some cases, applying a zero-valued timing advance may be appropriate based on the propagation delay 610 between base station 105-c and UE 115-c being similar to a propagation delay 620 between base station 105-d and UE 115-d. In some cases, the channel delay to a gNB (e.g., T1 and T2) may be roughly the same for a UE 115 at an edge of a cell 605. Therefore, both UE 115-c and UE 115-d may have a similar propagation delay. In some cases, distance between UE 115-c and UE 115-d may be negligible, such that the UEs 115 do not have to consider additional propagation delay between themselves.

Figure 7:
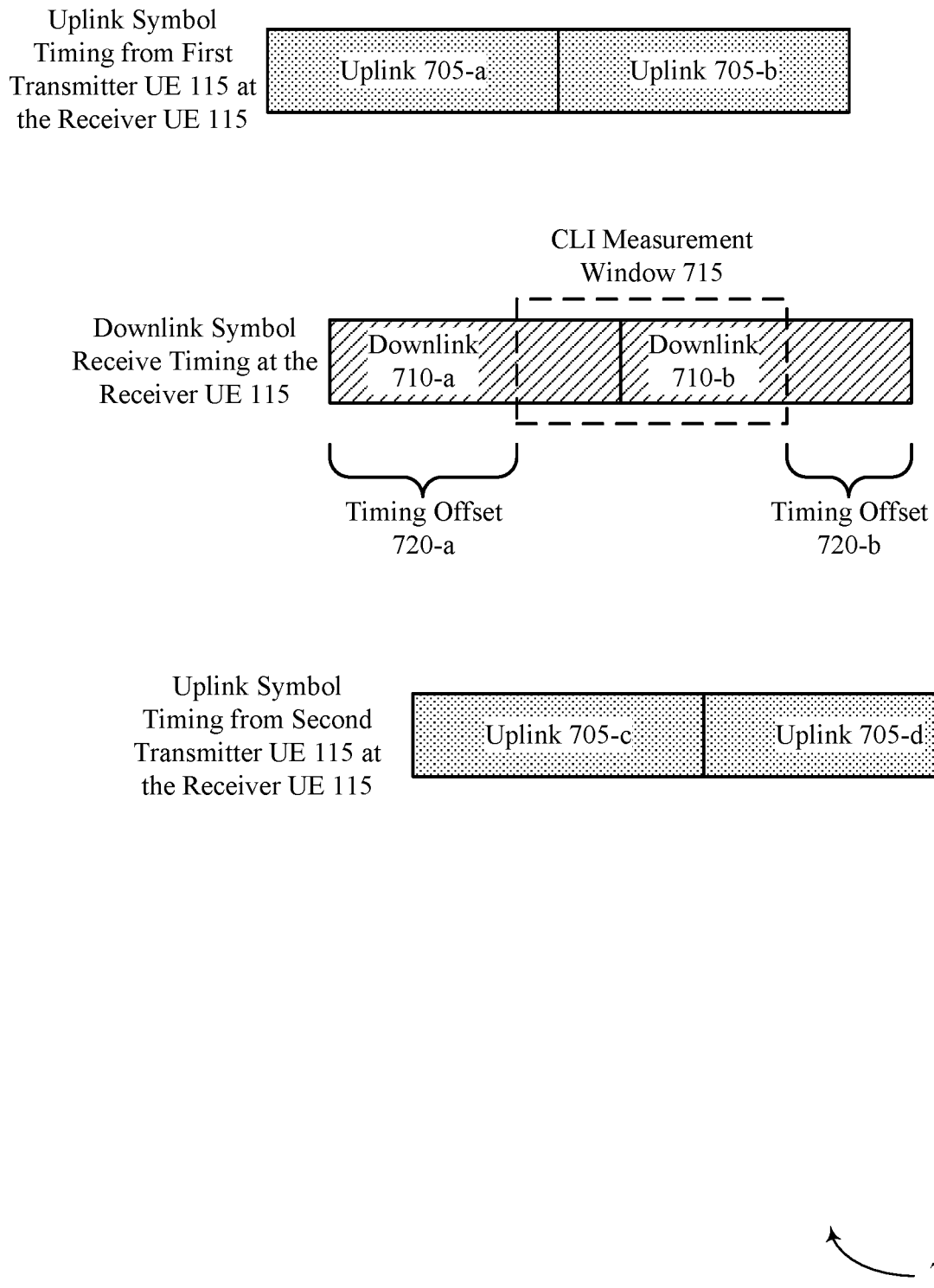
FIG. 7 illustrates an example of a timing offset that supports CLI measurement transmission schemes in accordance with aspects of the present disclosure.

FIG. 7 illustrates an example of a timing offset 700 that supports CLI measurement transmission schemes in accordance with aspects of the present disclosure. In some examples, timing offset 700 may implement aspects of wireless communications systems 100 or 200. Timing offset 700 may be used to mitigate effects of misalignments between uplink symbols 705 of a transmitter UE 115 (e.g., aggressor UE 115) and downlink symbols 710 of a receiver UE 115 (e.g., victim UE 115), when the receiver UE 115 is attempting to measure a signal strength (e.g., RSSI) of a UE-to-UE CLI with the transmitter UE 115 as described herein.

In some cases, the misalignment may occur between a symbol boundary of signals transmitted in uplink symbols 705-a and 705-b from a first transmitter UE 115 (e.g., a CLI signal transmitter) and a symbol boundary of downlink symbols 710-a and 710-b at the receiver UE 115. Additionally or alternatively, the misalignment may occur between the symbol boundary of uplink symbols 705-a and 705-b from the first transmitter UE 115 and a symbol boundary of uplink symbols 705-c and 705-d from a second transmitter UE 115 when the two sets of uplink symbols 705 arrive at the receiver UE 115. In some cases, the misalignments may be caused by different TAs configured for each transmitter UE 115.

To mitigate the effects of the misalignment and to enable the receiver UE 115 to perform a CLI measurement for one or both of the first and second transmitter UEs 115, the network may configure a CLI measurement window 715 based on one or more configured timing offsets 720. The CLI measurement window 715 may remove edges of the downlink symbols 710-a and 710-b where CLI signals from different transmitter UEs 115 are not aligned. In some cases, the network may configure the one or more timing offsets 720 semi-statically (e.g., via RRC signaling) or dynamically (e.g., via DCI messaging). Additionally, the network may configure the one or more timing offsets 720 with different durations. For example, timing offset 720-a may be configured for the beginning of the CLI measurement window 715 with a first duration, and timing offset 720-b may be configured for the end of the CLI measurement window 715 with a second duration. Each of the timing offsets 720 may also be configured relative to the symbol boundaries of the downlink symbols 710-a and 710-b of the receiver UE 115. In some cases, the timing offsets 720 may include sub-symbol level timing offsets for the CLI measurement window 715.

By configuring the CLI measurement window 715 based on these timing offsets 720, the receiver UE 115 may measure the signal strength of any uplink signals transmitted by the first transmitter UE 115 from uplink symbols 705-a and 705-b, the signal strength of any uplink signals transmitted by the second transmitter UE 115 from uplink symbols 705-c and 705-d, or both. Additionally, by removing the edges of the symbol boundaries for downlink symbols 710-a and 710-b, the CLI measurement window 715 may span one or more downlink symbols 710 and enable the receiver UE 115 to measure the CLI across the one or more downlink symbols 710.

Figure 8:
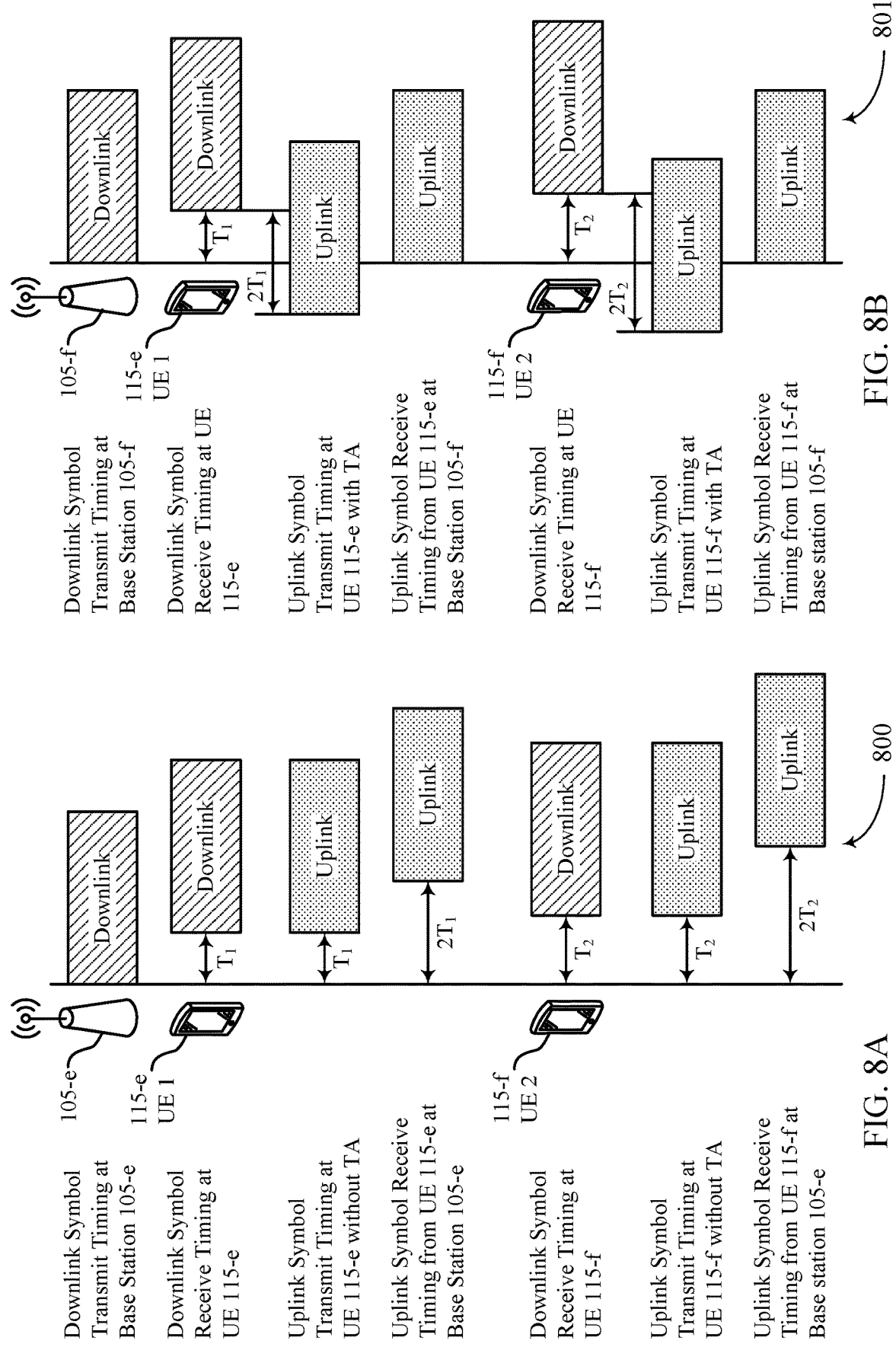
FIGS. 8A and 8B illustrate examples of uplink TA schemes that support CLI measurement transmission schemes in accordance with aspects of the present disclosure.

FIGS. 8A and 8B illustrate examples of uplink TA schemes 800 and 801 that support CLI measurement transmission schemes in accordance with aspects of the present disclosure. In some examples, uplink TA schemes 800 and 801 may implement aspects of wireless communications systems 100 or 200. Uplink TA schemes 800 and 801 may include a first base station 105-e and a second base station 105-f, which may be examples of base stations 105 as described herein. Additionally, uplink TA schemes 800 and 801 may include a first UE 115-e and a second UE 115-f, which may be examples of UEs 115 as described herein.

Uplink TA scheme 800 may include downlink and uplink symbol transmissions and receptions that do not include a TA configuration. For example, the uplink symbols from UE 115-e and UE 115-f may not be aligned at the first base station 105-e based on not using a TA for the uplink symbol transmissions. As shown, the first base station 105-e may include a downlink symbol transmit timing first. The first UE 115-e may have a corresponding downlink symbol receive timing based on a first propagation delay of $T_1$ based on a duration it takes between the first base station 105-e transmitting the downlink symbol and the first UE 115-e receiving the downlink symbol. Without a TA, the first UE 115-e may then have an uplink symbol transmit timing that includes the first propagation delay $T_1$. This first propagation delay may then be doubled (e.g., $2T_1$) for an uplink symbol receive timing from the first UE 115-e when received at the first base station 105-e with respect to the initial downlink symbol transmit timing. Similarly, the second UE 115-f may include a second propagation delay $T_2$ for a downlink symbol receive timing from the first base station 105-e, which may lead to the second propagation delay T2 occurring for an uplink symbol transmit timing from the second UE 115-f without a TA. Accordingly, an uplink symbol receive timing from the second UE 115-f at the first base station 105-e may include a delay equal to the second propagation delay doubled (e.g., $2T_2$).

As shown in uplink TA scheme 801, to align uplink symbols from the first UE 115-e and the second UE 115-f such that uplink transmissions are received at the same time, the second base station 105-f may configure TAs for the UEs 115 based on their respective propagation delays. For example, the first UE 115-e may use an uplink symbol transmit timing with a TA equal to double the first propagation delay (e.g., $2T_1$), and the second UE 115-f may use an uplink symbol transmit timing with a TA equal to double the second propagation delay (e.g., $2T_2$). Based on the respective TAs, the second base station 105-f may receive uplink transmissions from both the first UE 115-e and the second UE 115-f at the same time. In some cases, this simultaneous transmission may enable the base station 105-f to determine if either UE 115 may cause a CLI to victim UEs 115 connected to neighboring base stations 105 (e.g., cells).

Figure 9:
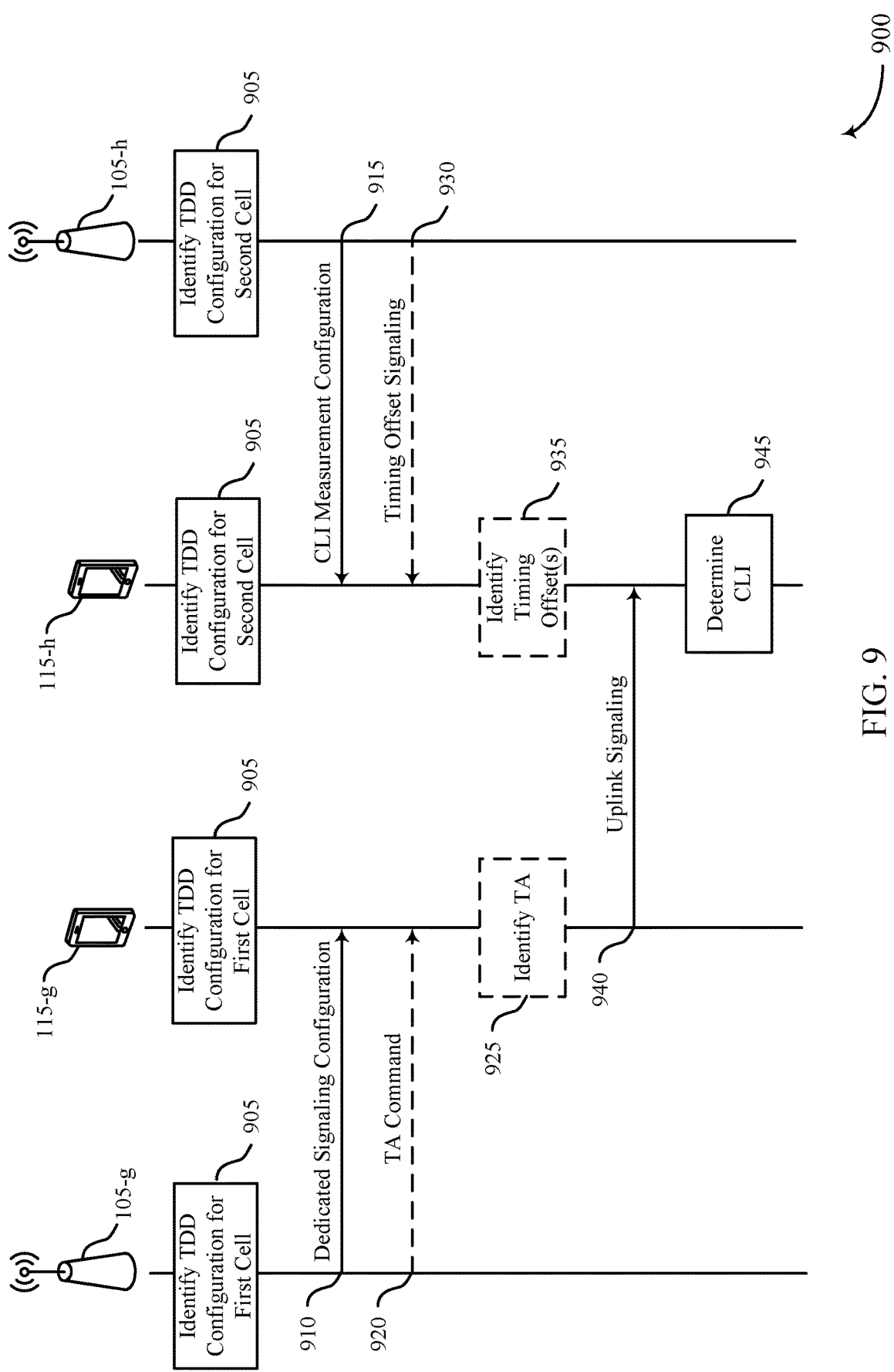
FIG. 9 illustrates an example of a process flow that supports CLI measurement transmission schemes in accordance with aspects of the present disclosure.

FIG. 9 illustrates an example of a process flow 900 that supports CLI measurement transmission schemes in accordance with aspects of the present disclosure. In some examples, process flow 900 may implement aspects of wireless communications systems 100 or 200. Process flow 900 may include a first base station 105-g, a first UE 115-g (e.g., a second wireless device), a second base station 105-h, and a second UE 115-h (e.g., a first wireless device), which may be examples of corresponding base stations 105 and UEs 115 as described herein. As described herein, the first UE 115-g may be scheduled for uplink transmissions in one or more same symbols that the second UE 115-h is scheduled for downlink transmissions. As such, CLI may occur on the one or more same symbols, where the uplink transmissions of the first UE 115-g (e.g., an aggressor UE 115, a transmitter UE 115) interfere with the second UE 115-h (e.g., a victim UE 115, a receiver UE 115) receiving downlink transmissions.

In the following description of the process flow 900, the operations between the first base station 105-g, the first UE 115-g, the second base station 105-h, and the second UE 115-h may be performed in different orders or at different times. Some operations may also be left out of the process flow 900, or other operations may be added to the process flow 900. It is to be understood that while base stations 105 and UEs 115 are shown performing the operations of process flow 900, any wireless device may perform the operations shown.

At 905, the first UE 115-g and the first base station 105-g may identify a first TDD configuration for communications in a first cell, where the first TDD configuration includes a symbol pattern for a slot of a set of slots. Additionally, the second UE 115-h and the second base station 105-h may identify a second TDD configuration for communications in a second cell, where the second TDD configuration also includes a symbol pattern for a slot of a set of slots. In some cases, the first UE 115-g and the second UE 115-h may be associated with a same cell of a base station 105. Additionally or alternatively, the first UE 115-g may be associated with a first cell served by a base station 105, and the second UE 115-h may be associated with a second cell served by the same base station 105. Additionally or alternatively, the first UE 115-g may be associated with a first cell served by the first base station 105-g, and the second UE 115-h may be associated with a second cell served by the second base station 105-h.

At 910, the first UE 115-g may receive a configuration for transmitting, to the second UE 115-h, dedicated signaling for measuring the CLI. In some cases, the first UE 115-g may receive the configuration in RRC signaling or DCI. For example, the DCI may provide a dynamic configuration of the dedicated signaling, a semi-persistent data channel configuration of the dedicated signaling, or a combination thereof. Additionally or alternatively, the RRC signaling may provide a periodic configuration of the dedicated signaling. In some cases, the second UE 115-g may receive an additional TDD configuration for the slot, the additional TDD configuration changing a downlink transmission direction indicated by the identified first TDD configuration for the at least one symbol period to an uplink transmission direction.

At 915, the second UE 115-h may receive a configuration for measuring uplink signaling from the first UE 115-g, the uplink signaling for measuring the CLI. In some cases, the second UE 115-h may receive the configuration in RRC signaling or DCI. For example, the DCI may provide a dynamic data channel configuration, a semi-persistent data channel configuration, or a combination thereof. Additionally or alternatively, the RRC signaling may provide a periodic data channel configuration. In some cases, the second UE 115-h may receive an additional TDD configuration for the slot, the additionally TDD configuration changing an uplink transmission direction indicated by the identified second TDD configuration for the at least one symbol period to a downlink transmission direction.

At 920, the first UE 115-g may receive a TA command indicating a TA for one or more uplink transmissions.

At 925, the first UE 115-g may identify a TA for an uplink data channel of the slot and apply the identified TA to transmit the dedicated signaling. Additionally or alternatively, the first UE 115-g may identify a first TA for an uplink data channel of the slot, identify a second TA for the dedicated signaling of the slot, the first timing advance different from the second timing advance, and apply the second TA to transmit the dedicated signaling. In some cases, the second TA may be received with the TA command at 920. Additionally, the second TA may be a zero-valued TA. In some cases, the first UE 115-g may determine, based on the first TA and the second TA, that an uplink transmission scheduled during an uplink symbol period subsequent to the at least one symbol period may collide with the dedicated signaling. Accordingly, the first UE 115-*g* may drop, based on the determining, the uplink transmission during the uplink symbol period.

At 930, the second UE 115-*h* may receive RRC signaling, or DCI, or a combination thereof, indicating one or more timing offsets.

At 935, the second UE 115-*h* may identify the one or more timing offsets for a measurement window for receiving the uplink signaling from the first UE 115-*g*, where the CLI is determined based on the received dedicated uplink signaling for the measurement window. In some cases, a first of the one or more timing offsets may be configured at the beginning of the measurement window, or a second of the one or more timing offsets may be configured at the end of the measurement window, or a combination thereof. Additionally, the measurement window may span one or more downlink symbols of the identified second TDD configuration.

At 940, the first UE 115-*g* may transmit the dedicated signaling in at least one symbol period of the slot according to the received configuration. Additionally, the second UE 115-*h* may receive, according to the received configuration, the uplink signaling in at least one symbol period of the slot. In some cases, the second UE 115-*h* may receive the dedicated signaling in the at least one symbol period of the slot according to the received configuration. For example, the first UE 115-*g* may transmit, and the second UE 115-*h* may receive, CLI reference signals in the at least one symbol according to their respective configurations. In some cases, the received CLI reference signals may be generated based on a Zadoff-Chu sequence, a Gold sequence, or another encoding sequence. Additionally, the CLI reference signals may include uplink DMRSs, or uplink CSI-RSs, or a combination thereof. In some cases, the first UE 115-*g* may transmit, and the second UE 115-*h* may receive, the CLI reference signals in the at least one symbol period without corresponding uplink data. Additionally or alternatively, for the dedicated signaling, the first UE 115-*g* may transmit, and the second UE 115-*h* may receive, pseudo-randomly generated symbols in the at least one symbol period of the slot according to their respective received configurations.

In some cases, the first UE 115-*g* may transmit the dedicated signaling based on transmitting uplink data in the at least one symbol period according to the additionally received TDD configuration that changed the downlink transmission direction indicated by the identified first TDD configuration for the at least one symbol period to the uplink transmission direction. Similarly, the second UE 115-*h* may receive the uplink signaling based on receiving the uplink signaling from the first UE 115-*g* in the at least one symbol period according to the downlink transmission direction according to the additionally received TDD configuration that changed the uplink transmission direction indicated by the identified second TDD configuration for the at least one symbol period to the downlink transmission direction. Additionally or alternatively, the second UE 115-*h* may receive receiving uplink data, uplink reference signals, uplink control channel signaling, or a combination thereof, in the at least one symbol period of the slot according to its received configuration.

In some cases, the first UE 115-*g* may transmit, in the at least one symbol period of the slot, the dedicated signaling using one or more uplink transmit beams different from a serving transmit beam of a cell serving the second wireless device. Additionally or alternatively, the first UE 115-*g* may transmit, in the at least one symbol period of the slot, the dedicated signaling using a serving precoding matrix At 945, the second UE 115-*h* may determine the CLI based on the received uplink signaling. For example, the second UE 115-*h* may measure a signal strength (e.g., RSSI) of the received uplink signaling to determine a CLI value. In some cases, the second UE 115-*h* may discard the determined CLI value based on the measured signal strength being less than or equal to a signal strength threshold. Alternatively, the second UE 115-*h* may determine that the determined CLI value is valid based on the measured signal strength being greater than or equal to the signal strength threshold.

Figure 10:
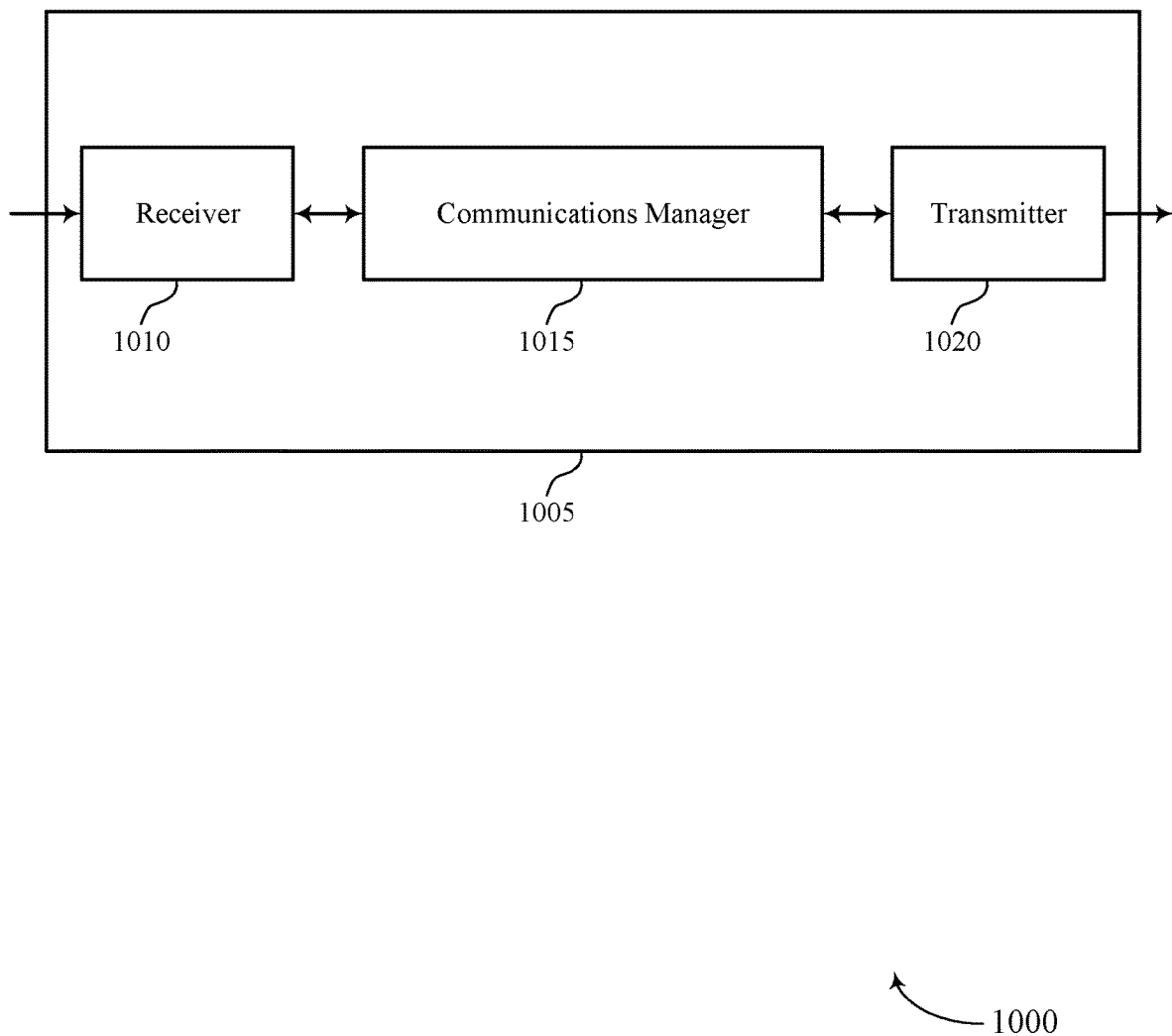
FIGS. 10 and 11 show block diagrams of devices that support cross-link interference measurement transmission schemes in accordance with aspects of the present disclosure.

FIG. 10 shows a block diagram 1000 of a device 1005 that supports CLI measurement transmission schemes in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to CLI measurement transmission schemes). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a TDD configuration for a second wireless device (e.g., a UE 115, an aggressor UE 115, a transmitting UE 115), where the TDD configuration includes a symbol pattern for a slot of a set of slots. Additionally, the communications manager 1015 may receive a configuration for transmitting, to a first wireless device (e.g., a UE 115, a victim UE 115, a receiving UE 115), dedicated signaling for measuring a CLI). Accordingly, the communications manager 1015 may transmit the dedicated signaling in at least one symbol period of the slot according to the received configuration.

Additionally or alternatively, the communications manager 1015 may also identify, for the first wireless device, a TDD configuration including a symbol pattern for a slot of a set of slots. The communications manager 1015 may also receive a configuration for measuring uplink signaling from the second wireless device, the uplink signaling for measuring the CLI. Additionally, the communications manager 1015 may receive, according to the received configuration, the uplink signaling in at least one symbol period of the slot. In some cases, the communications manager 1015 may determine the CLI based on the received uplink signaling. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 1015 as described herein may be implemented to realize one or more potential advantages. One implementation may allow the device 1105 to save power and increase battery life by more accurately and efficiently measuring interference (e.g., CLI), so that base stations serving the device 1105 may better perform configure, schedule, and otherwise manage device 1105. Accurate and efficient CLI measurements may also reduce interference on a medium, allowing for greater communications capacity and throughput for devices, including device 1105. Reduced interference may also reduce processing load on a processor, such as in a modem, of a device 1105 or UE 115 by reducing the amount of unsuccessful decoding operations, transmissions, retransmission, and so on, that the processor needs to handle.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
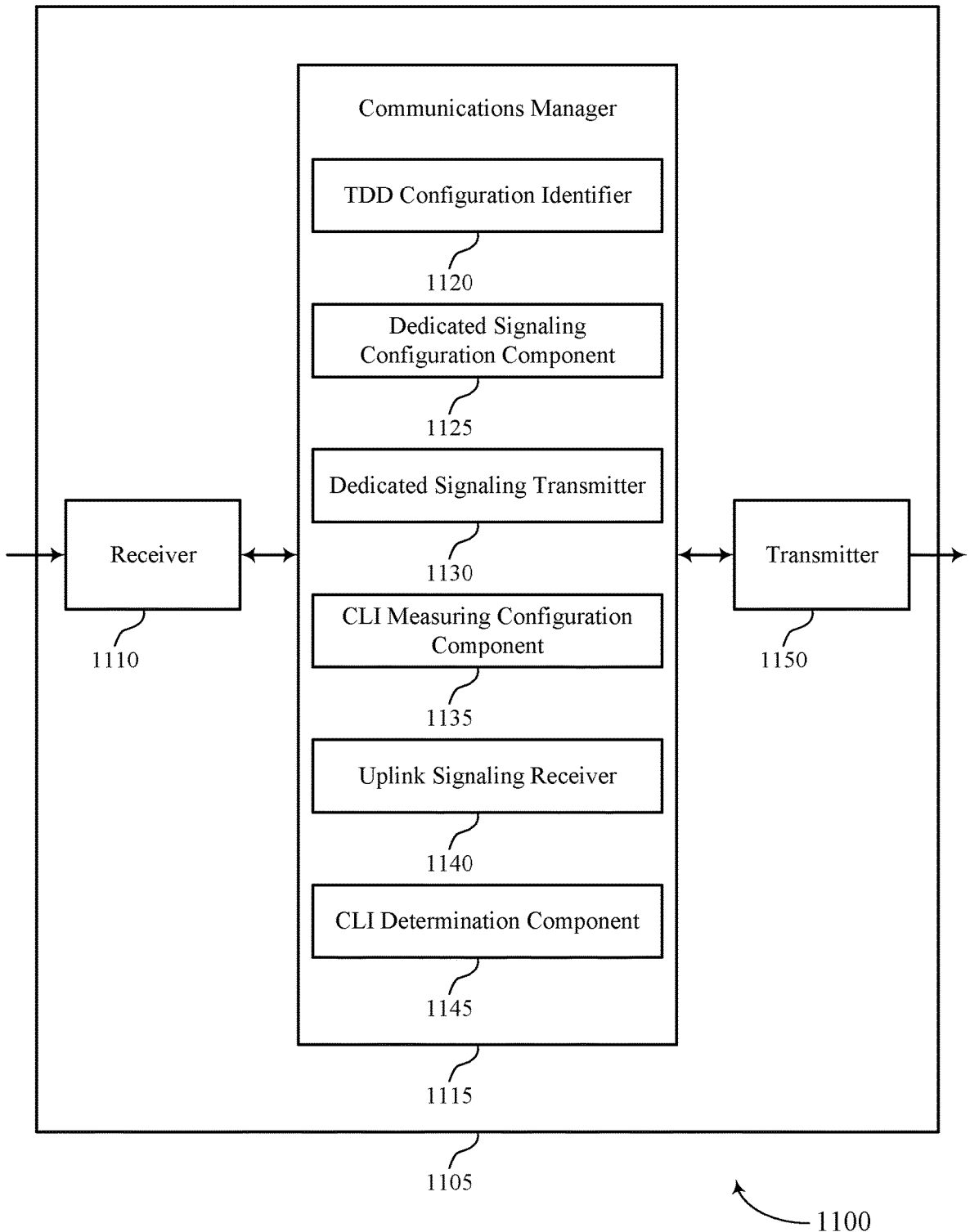

FIG. 11 shows a block diagram 1100 of a device 1105 that supports CLI measurement transmission schemes in accordance with aspects of the present disclosure. The device 1105 may be an example of aspects of a device 1005, or a UE 115 as described herein. The device 1105 may include a receiver 1110, a communications manager 1115, and a transmitter 1150. The device 1105 may also include a processor. Each of these components may be in communication with one another (e.g., via one or more buses).

The receiver 1110 may receive information such as packets, user data, or control information associated with various information channels (e.g., control channels, data channels, and information related to CLI measurement transmission schemes). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a TDD configuration identifier 1120, a dedicated signaling configuration component 1125, a dedicated signaling transmitter 1130, a CLI measuring configuration component 1135, an uplink signaling receiver 1140, and a CLI determination component 1145. The communications manager 1115 may be an example of aspects of the communications manager 1310 described herein.

The TDD configuration identifier 1120 may identify a TDD configuration for a second wireless device (e.g., a UE 115, an aggressor UE 115, a transmitting UE 115), where the TDD configuration includes a symbol pattern for a slot of a set of slots. Additionally, the TDD configuration identifier 1120 may identify, for a first wireless device (e.g., a UE 115, a victim UE 115, a receiving UE 115), a TDD configuration including a symbol pattern for a slot of a set of slots.

The dedicated signaling configuration component 1125 may receive a configuration for transmitting, to the first wireless device, dedicated signaling for measuring a CLI.

The dedicated signaling transmitter 1130 may transmit the dedicated signaling in at least one symbol period of the slot according to the received configuration.

The CLI measuring configuration component 1135 may receive a configuration for measuring uplink signaling from the second wireless device, the uplink signaling for measuring a CLI.

The uplink signaling receiver 1140 may receive, according to the received configuration, the uplink signaling in at least one symbol period of the slot.

The CLI determination component 1145 may determine the CLI based on the received uplink signaling.

The transmitter 1150 may transmit signals generated by other components of the device 1105. In some examples, the transmitter 1150 may be collocated with a receiver 1110 in a transceiver module. For example, the transmitter 1150 may be an example of aspects of the transceiver 1320 described with reference to FIG. 13. The transmitter 1150 may utilize a single antenna or a set of antennas.

Figure 12:
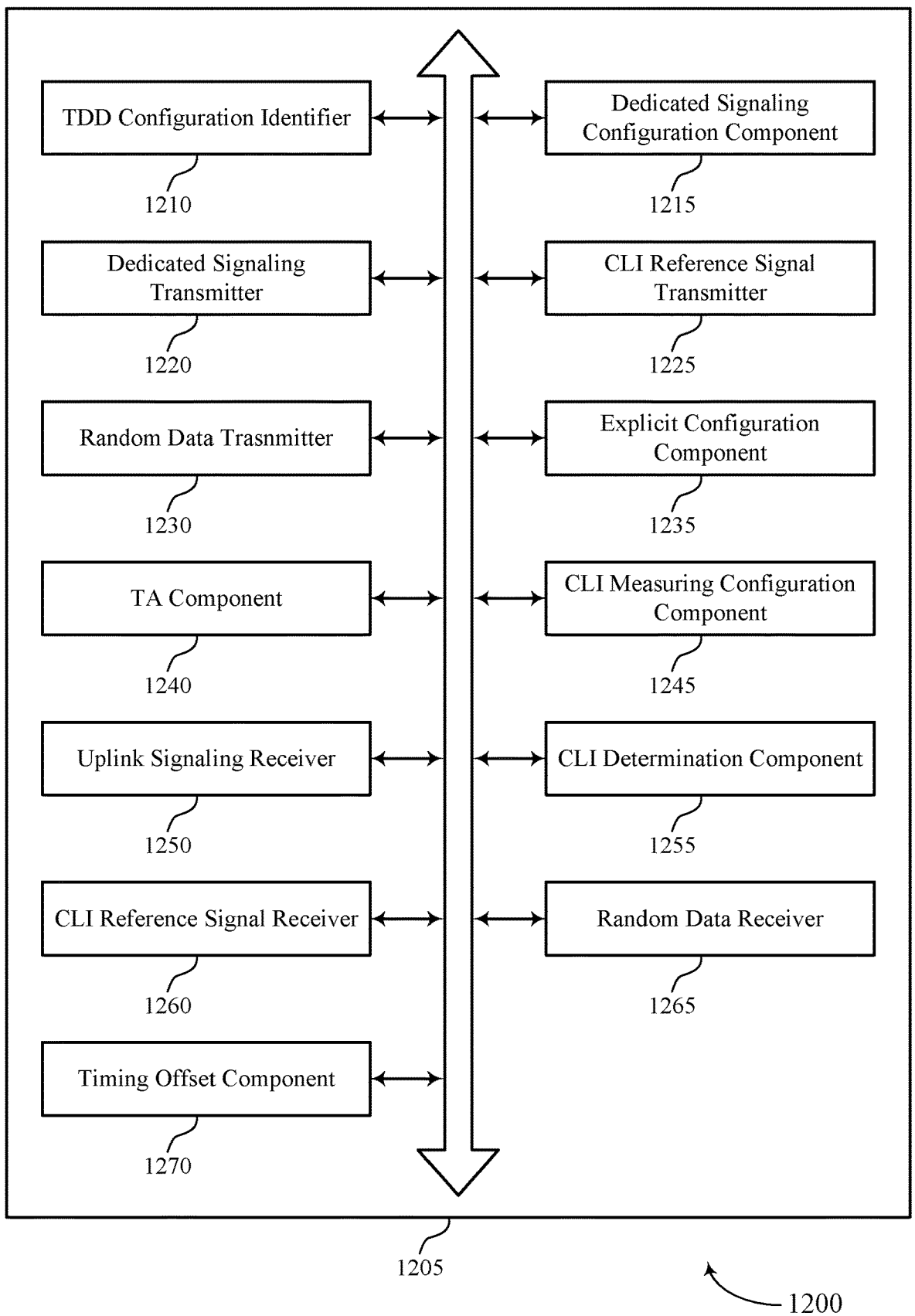
FIG. 12 shows a block diagram of a communications manager that supports cross-link interference measurement transmission schemes in accordance with aspects of the present disclosure.

FIG. 12 shows a block diagram 1200 of a communications manager 1205 that supports CLI measurement transmission schemes in accordance with aspects of the present disclosure. The communications manager 1205 may be an example of aspects of a communications manager 1015, a communications manager 1115, or a communications manager 1310 described herein. The communications manager 1205 may include a TDD configuration identifier 1210, a dedicated signaling configuration component 1215, a dedicated signaling transmitter 1220, a CLI reference signal transmitter 1225, a random data transmitter 1230, an explicit configuration component 1235, a TA component 1240, a CLI measuring configuration component 1245, an uplink signaling receiver 1250, a CLI determination component 1255, a CLI reference signal receiver 1260, a random data receiver 1265, and a timing offset component 1270. Each of these modules may communicate, directly or indirectly, with one another (e.g., via one or more buses).

The TDD configuration identifier 1210 may identify a TDD configuration for a second wireless device (e.g., a UE 115, an aggressor UE 115, a transmitting UE 115), where the TDD configuration includes a symbol pattern for a slot of a set of slots. Additionally, the TDD configuration identifier 1210 may identify, for a first wireless device (e.g., a UE 115, a victim UE 115, a receiving UE 115), a TDD configuration including a symbol pattern for a slot of a set of slots.

In some cases, the second wireless device and the first wireless device may be associated with a same cell of a base station. Additionally or alternatively, the second wireless device may be associated with a first cell served by a base station, and the first wireless device may be associated with a second cell served by the base station. Additionally or alternatively, the second wireless device may be associated with a first cell served by a first base station, and the first wireless device may be associated with a second cell served by a second base station.

The dedicated signaling configuration component 1215 may receive a configuration for transmitting, to the first wireless device, dedicated signaling for measuring a CLI. In some examples, the dedicated signaling configuration component 1215 may receive the configuration for transmitting the dedicated signaling in RRC signaling or DCI. For example, the DCI may provide a dynamic configuration of the dedicated signaling or a semi-persistent data channel configuration of the dedicated signaling. Additionally or alternatively, the RRC signaling may provide a periodic configuration of the dedicated signaling.

The dedicated signaling transmitter 1220 may transmit the dedicated signaling in at least one symbol period of the slot according to the received configuration. In some cases, the dedicated signaling transmitter 1220 may transmit, in the at least one symbol period of the slot, the dedicated signaling using one or more uplink transmit beams different from a serving transmit beam of a cell serving the second wireless device. Additionally or alternatively, the dedicated signaling transmitter 1220 may transmit, in the at least one symbol period of the slot, the dedicated signaling using a serving precoding matrix.

The CLI measuring configuration component 1245 may receive a configuration for measuring uplink signaling from the second wireless device, the uplink signaling for measuring a CLI. In some examples, the CLI measuring configuration component 1245 may receive the configuration in RRC signaling or DCI. For example, the DCI may provide a dynamic data channel configuration or a semi-persistent data channel configuration. Additionally or alternatively, the RRC signaling may provide a periodic data channel configuration.

The uplink signaling receiver 1250 may receive, according to the received configuration, the uplink signaling in at least one symbol period of the slot. In some examples, the uplink signaling receiver 1250 may receive dedicated signaling in the at least one symbol period of the slot according to the received configuration. Additionally or alternatively, the uplink signaling receiver 1250 may receive uplink data, uplink reference signals, uplink control channel signaling, or a combination thereof, in the at least one symbol period of the slot according to the received configuration.

The CLI determination component 1255 may determine the CLI based on the received uplink signaling. For example, the CLI determination component 1255 may measure a signal strength of the received uplink signaling to determine a CLI value. In some cases, the CLI determination component 1255 may discard the determined CLI value based on the measured signal strength being less than or equal to a signal strength threshold. Alternatively, the CLI determination component 1255 may determine that the determined CLI value is valid based on the measured signal strength being greater than or equal to the signal strength threshold.

The CLI reference signal transmitter 1225 may transmit CLI reference signals in the at least one symbol period. In some examples, the CLI reference signal transmitter 1225 may transmit the CLI reference signals in the at least one symbol period without corresponding uplink data. In some cases, the transmitted CLI reference signals may be generated based on a Zadoff-Chu sequence or a Gold sequence. Additionally, the CLI reference signals may include uplink DMRSs, or uplink CSI-RSs, or a combination thereof.

The random data transmitter 1230 may transmit pseudo-randomly generated symbols in the at least one symbol period.

The explicit configuration component 1235 may receive the configuration for transmitting dedicated signaling based on receiving a second TDD configuration for the slot, the second TDD configuration changing a downlink transmission direction indicated by the identified TDD configuration for the at least one symbol period to an uplink transmission direction. Accordingly, transmitting the dedicated signaling may include transmitting uplink data in the at least one symbol period according to the received configuration.

Additionally or alternatively, the explicit configuration component 1235 may receive the configuration for measuring the uplink signaling based on receiving a second TDD configuration for the slot, the second TDD configuration changing an uplink transmission direction indicated by the identified TDD configuration for the at least one symbol period to a downlink transmission direction. Accordingly, receiving the uplink signaling may include receiving the uplink signaling from the second wireless device in the at least one symbol period according to the downlink transmission direction.

The TA component 1240 may identify a timing advance for an uplink data channel of the slot and may apply the identified TA to transmit the dedicated signaling. Additionally or alternatively, the TA component 1240 may identify a first TA for an uplink data channel of the slot, identify a second TA for the dedicated signaling of the slot, the first TA different from the second TA, and apply the second TA to transmit the dedicated signaling. In some examples, the TA component 1240 may determine, based on the first TA and the second TA, that an uplink transmission scheduled during an uplink symbol period subsequent to the at least one symbol period collides with the dedicated signaling and may drop, based on the determining, the uplink transmission during the uplink symbol period. In some examples, the TA component 1240 may receive a TA command indicating the second TA. Additionally, the second TA is a zero-valued TA.

The CLI reference signal receiver 1260 may receive the CLI reference signals in the at least one symbol period of the slot according to the received configuration. In some examples, the CLI reference signal receiver 1260 may receive the CLI reference signals in the at least one symbol period without corresponding uplink data. In some cases, the received CLI reference signals are generated based on a Zadoff-Chu sequence or a Gold sequence. Additionally, the CLI reference signals include uplink DMRSs, or uplink CSI-RSs, or a combination thereof.

The random data receiver 1265 may receive pseudo-randomly generated symbols in the at least one symbol period of the slot according to the received configuration.

The timing offset component 1270 may identify one or more timing offsets for a measurement window for receiving the uplink signaling from the second wireless device, where the CLI is determined based on the received dedicated uplink signaling for the measurement window. In some examples, the timing offset component 1270 may receive RRC signaling, or DCI, or a combination thereof, indicating the one or more timing offsets. In some cases, a first of the one or more timing offsets is configured at the beginning of the measurement window, or a second of the one or more timing offsets is configured at the end of the measurement window, or a combination thereof. Additionally, the measurement window spans one or more downlink symbols of the identified TDD configuration.

Figure 13:
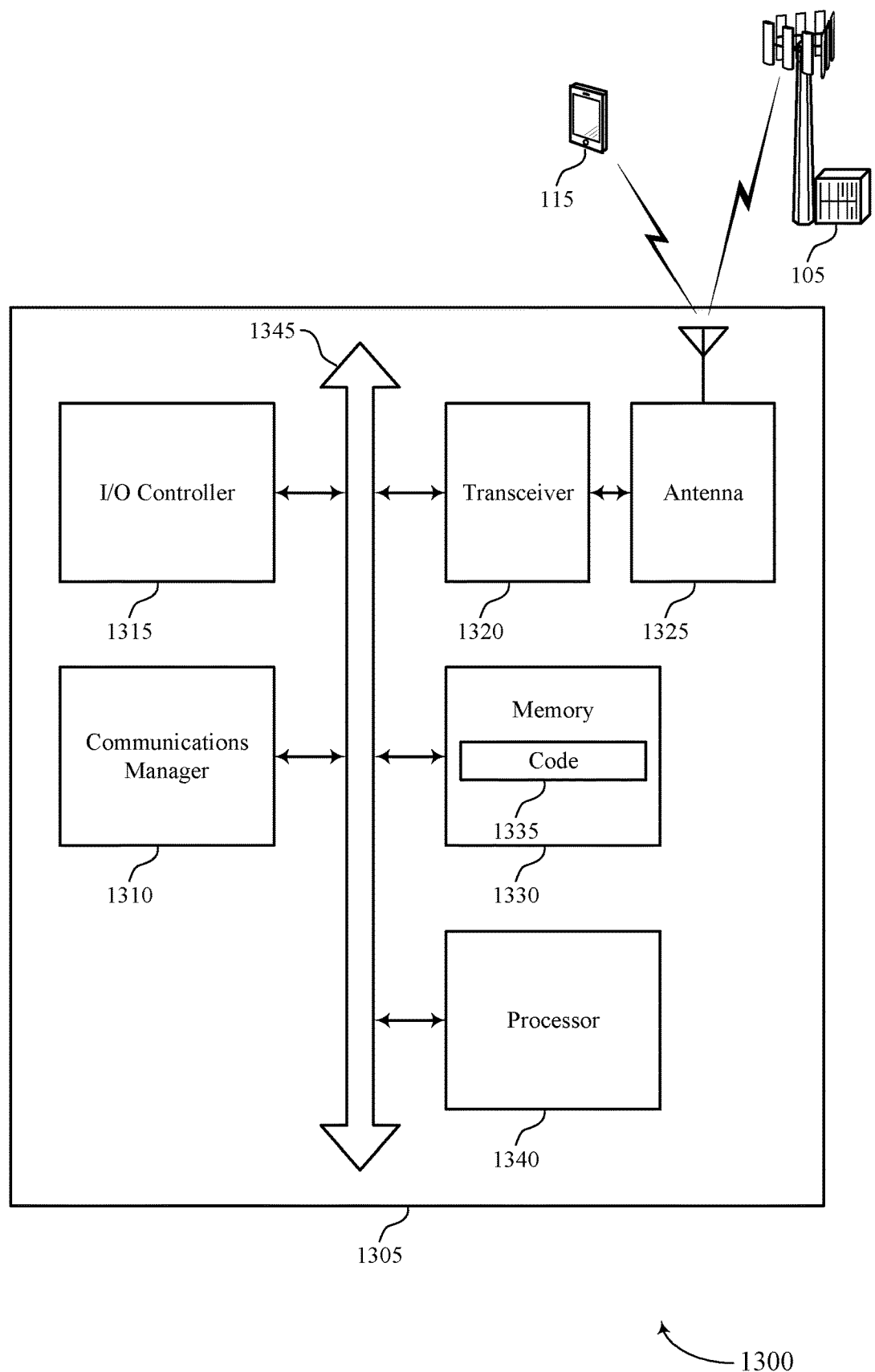
FIG. 13 shows a diagram of a system including a device that supports cross-link interference measurement transmission schemes in accordance with aspects of the present disclosure.

FIG. 13 shows a diagram of a system 1300 including a device 1305 that supports CLI measurement transmission schemes in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may identify a TDD configuration for the second wireless device (e.g., a UE 115, an aggressor UE 115, a transmitting UE 115), where the TDD configuration includes a symbol pattern for a slot of a set of slots. Additionally, the communications manager 1310 may receive a configuration for transmitting, to a first wireless device (e.g., a UE 115, a victim UE 115, a receiving UE 115), dedicated signaling for measuring a CLI. Accordingly, the communications manager 1310 may transmit the dedicated signaling in at least one symbol period of the slot according to the received configuration.

Additionally or alternatively, the communications manager 1310 may identify, for the first wireless device, a TDD configuration including a symbol pattern for a slot of a set of slots. In some cases, the communications manager 1310 may receive a configuration for measuring uplink signaling from a second wireless device, the uplink signaling for measuring a CLI. Additionally, the communications manager 1310 may receive, according to the received configuration, the uplink signaling in at least one symbol period of the slot. Accordingly, the communications manager 1310 may determine the CLI based on the received uplink signaling.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random-access memory (RAM) and read-only memory (ROM). The memory 1330 may store computer-readable, computer-executable code 1335 including instructions that, when executed, cause the processor to perform various functions described herein. In some cases, the memory 1330 may contain, among other things, a basic I/O system (BIOS) which may control basic hardware or software operation such as the interaction with peripheral components or devices.

The processor 1340 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting CLI measurement transmission schemes).

The computer-executable code 1335 may include instructions to implement aspects of the present disclosure, including instructions to support wireless communications. The code 1335 may be stored in a non-transitory computer-readable medium such as system memory or other type of memory. In some cases, the computer-executable code 1335 may not be directly executable by the processor 1340 but may cause a computer (e.g., when compiled and executed) to perform functions described herein.

Figure 14:
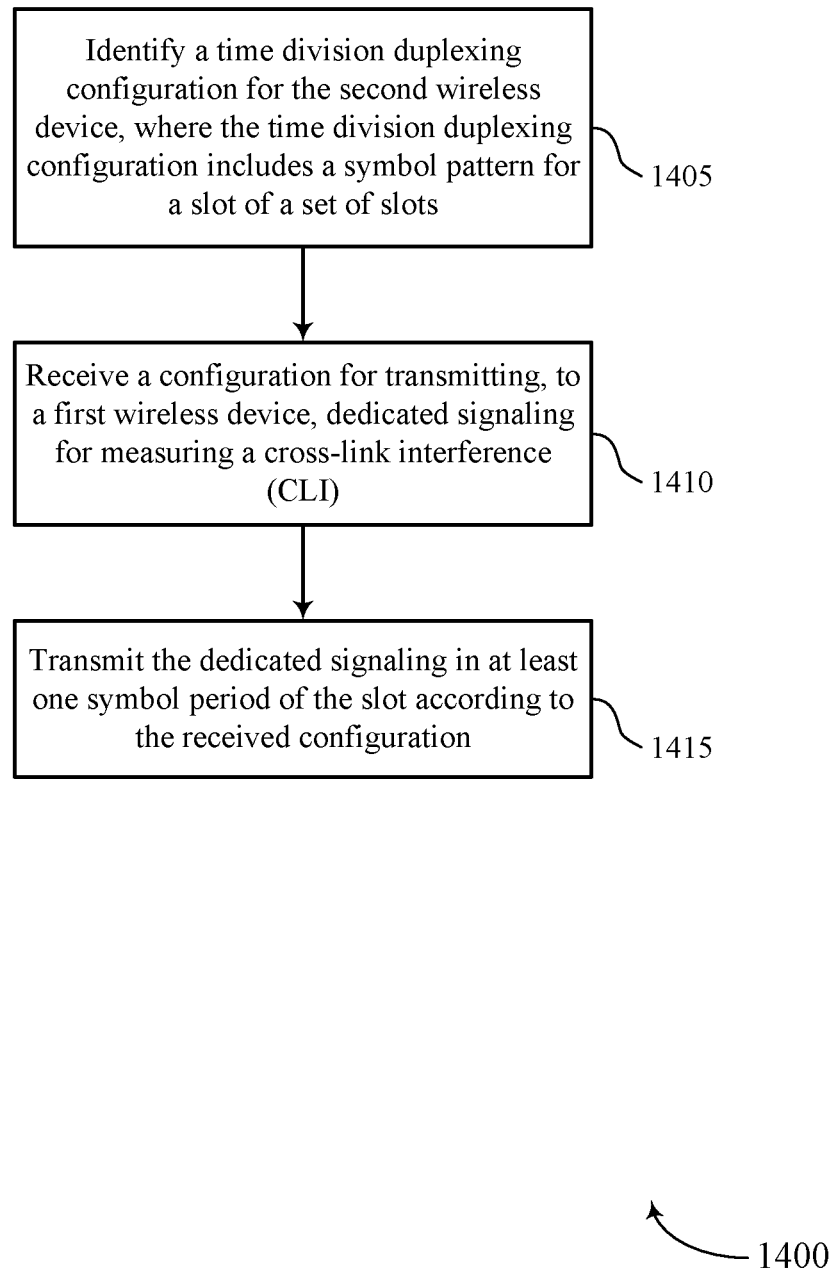
FIGS. 14 through 20 show flowcharts illustrating methods that support cross-link interference measurement transmission schemes in accordance with aspects of the present disclosure.

FIG. 14 shows a flowchart illustrating a method 1400 that supports CLI measurement transmission schemes in accordance with aspects of the present disclosure. The operations of method 1400 may be implemented by a UE 115 (e.g., a second wireless device, an aggressor UE 115, a transmitting UE 115) or its components as described herein. For example, the operations of method 1400 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 1405, the UE may identify a TDD configuration for itself, where the TDD configuration includes a symbol pattern for a slot of a set of slots. The operations of 1405 may be performed according to the methods described herein. In some examples, aspects of the operations of 1405 may be performed by a TDD configuration identifier as described with reference to FIGS. 10 through 13.

At 1410, the UE may receive a configuration for transmitting, to a first wireless device (e.g., a second UE, a victim UE, a receiving UE, etc.), dedicated signaling for measuring a CLI. The operations of 1410 may be performed according to the methods described herein. In some examples, aspects of the operations of 1410 may be performed by a dedicated signaling configuration component as described with reference to FIGS. 10 through 13.

At 1415, the UE may transmit the dedicated signaling in at least one symbol period of the slot according to the received configuration. The operations of 1415 may be performed according to the methods described herein. In some examples, aspects of the operations of 1415 may be performed by a dedicated signaling transmitter as described with reference to FIGS. 10 through 13.

Figure 15:
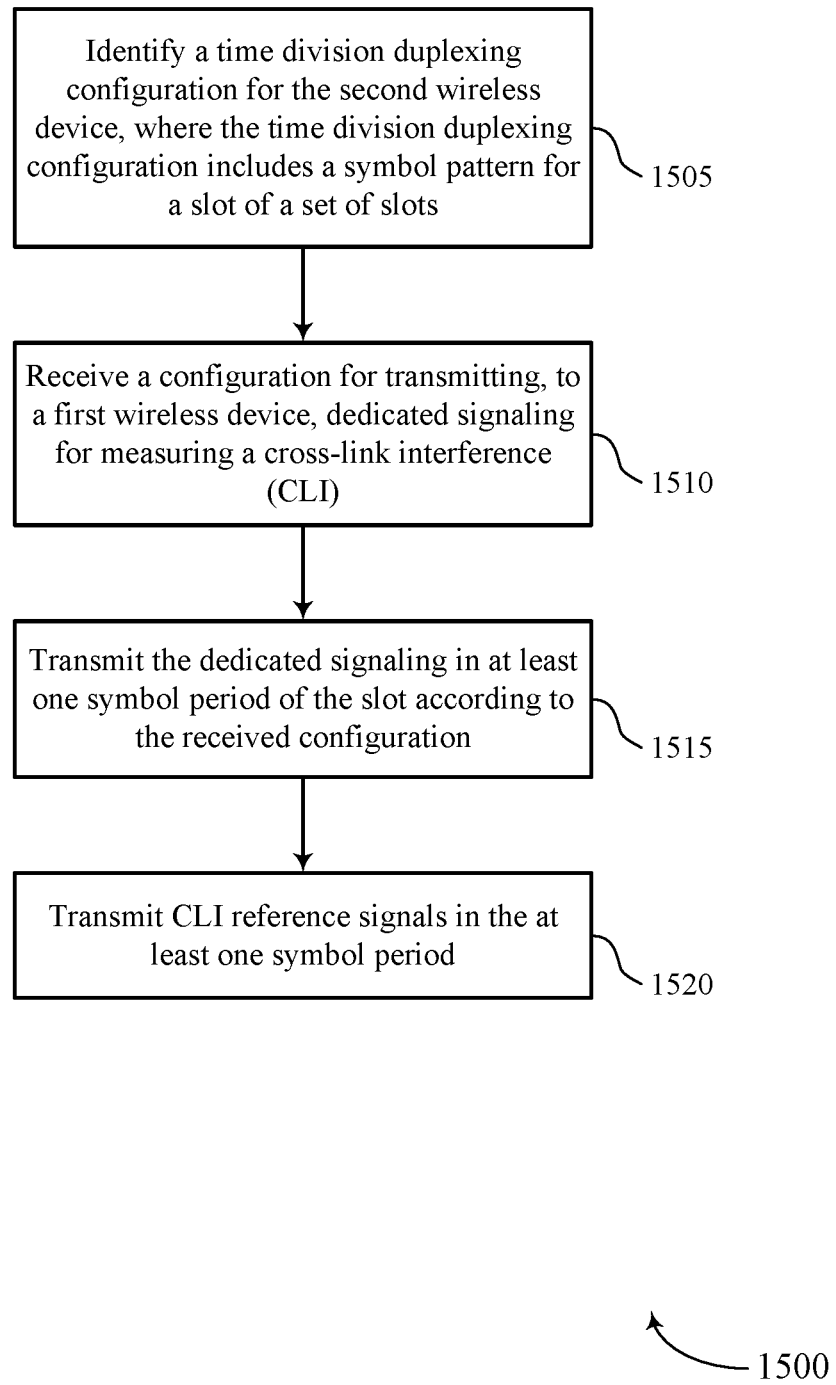

FIG. 15 shows a flowchart illustrating a method 1500 that supports CLI measurement transmission schemes in accordance with aspects of the present disclosure. The operations of method 1500 may be implemented by a UE 115 (e.g., a second wireless device, an aggressor UE 115, a transmitting UE 115) or its components as described herein. For example, the operations of method 1500 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 1505, the UE may identify a TDD configuration for itself, where the TDD configuration includes a symbol pattern for a slot of a set of slots. The operations of 1505 may be performed according to the methods described herein. In some examples, aspects of the operations of 1505 may be performed by a TDD configuration identifier as described with reference to FIGS. 10 through 13.

At 1510, the UE may receive a configuration for transmitting, to a first wireless device (e.g., a second UE, a victim UE, a receiving UE), dedicated signaling for measuring a CLI. The operations of 1510 may be performed according to the methods described herein. In some examples, aspects of the operations of 1510 may be performed by a dedicated signaling configuration component as described with reference to FIGS. 10 through 13.

At 1515, the UE may transmit the dedicated signaling in at least one symbol period of the slot according to the received configuration. The operations of 1515 may be performed according to the methods described herein. In some examples, aspects of the operations of 1515 may be performed by a dedicated signaling transmitter as described with reference to FIGS. 10 through 13.

At 1520, the UE may transmit CLI reference signals in the at least one symbol period. The operations of 1520 may be performed according to the methods described herein. In some examples, aspects of the operations of 1520 may be performed by a CLI reference signal transmitter as described with reference to FIGS. 10 through 13.

Figure 16:
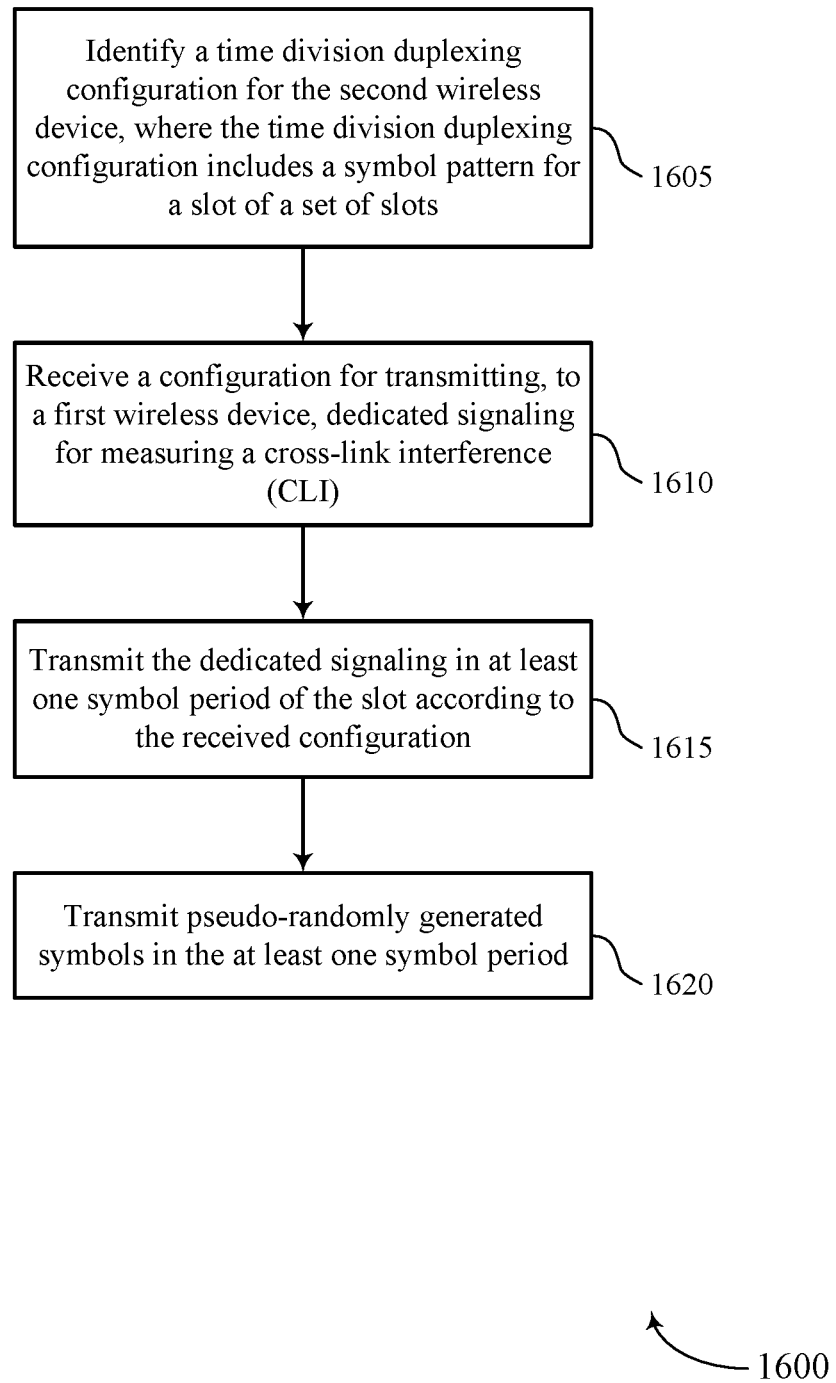

FIG. 16 shows a flowchart illustrating a method 1600 that supports CLI measurement transmission schemes in accordance with aspects of the present disclosure. The operations of method 1600 may be implemented by a UE 115 (e.g., a second wireless device, an aggressor UE 115, a transmitting UE 115) or its components as described herein. For example, the operations of method 1600 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 1605, the UE may identify a TDD configuration for itself, where the TDD configuration includes a symbol pattern for a slot of a set of slots. The operations of 1605 may be performed according to the methods described herein. In some examples, aspects of the operations of 1605 may be performed by a TDD configuration identifier as described with reference to FIGS. 10 through 13.

At 1610, the UE may receive a configuration for transmitting, to a first wireless device (e.g., a second UE, a victim UE, a receiving UE), dedicated signaling for measuring a CLI. The operations of 1610 may be performed according to the methods described herein. In some examples, aspects of the operations of 1610 may be performed by a dedicated signaling configuration component as described with reference to FIGS. 10 through 13.

At 1615, the UE may transmit the dedicated signaling in at least one symbol period of the slot according to the received configuration. The operations of 1615 may be performed according to the methods described herein. In some examples, aspects of the operations of 1615 may be performed by a dedicated signaling transmitter as described with reference to FIGS. 10 through 13.

At 1620, the UE may transmit pseudo-randomly generated symbols in the at least one symbol period. The operations of 1620 may be performed according to the methods described herein. In some examples, aspects of the operations of 1620 may be performed by a random data transmitter as described with reference to FIGS. 10 through 13.

Figure 17:
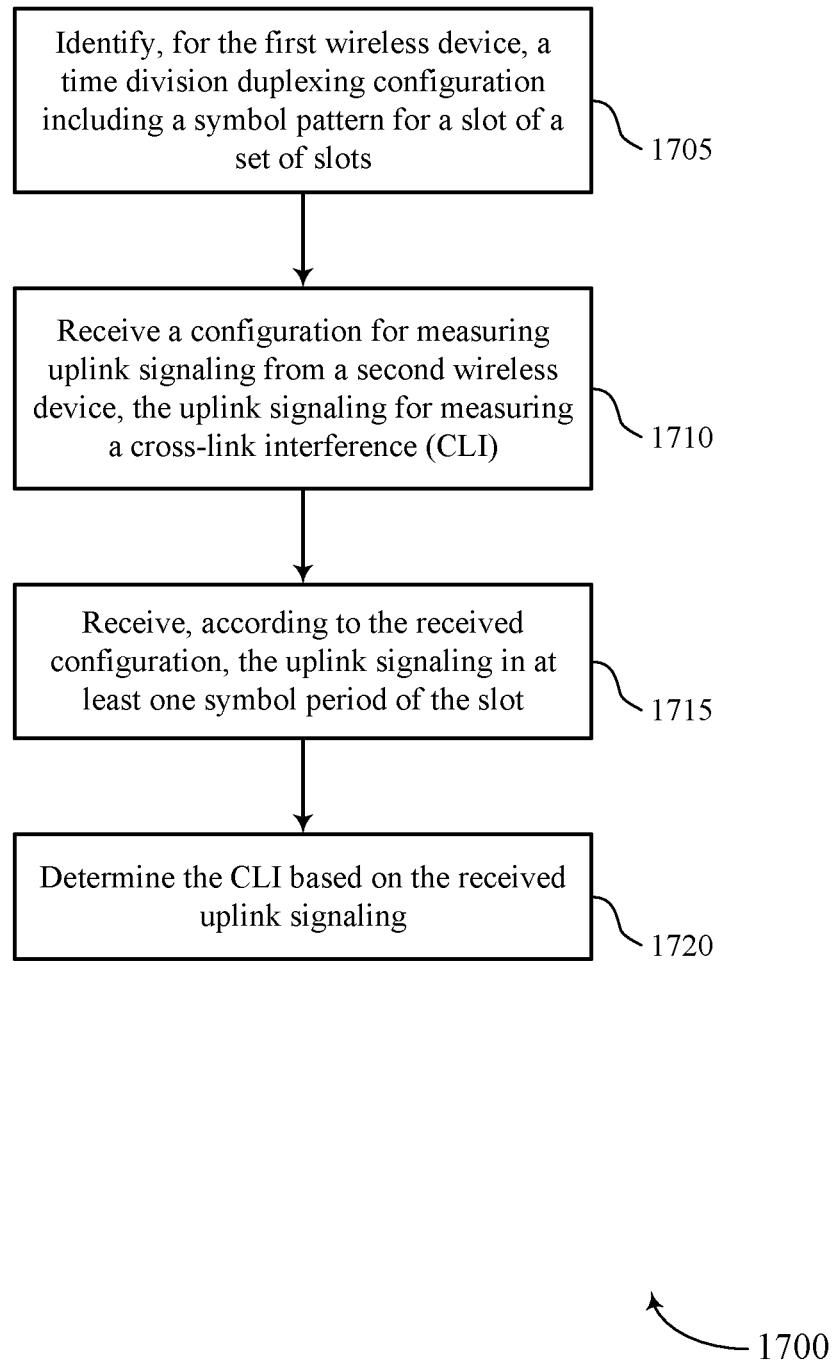

FIG. 17 shows a flowchart illustrating a method 1700 that supports CLI measurement transmission schemes in accordance with aspects of the present disclosure. The operations of method 1700 may be implemented by a UE 115 (e.g., a first wireless device, a victim UE 115, a receiving UE 115) or its components as described herein. For example, the operations of method 1700 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 1705, the UE may identify, for itself, a TDD configuration including a symbol pattern for a slot of a set of slots. The operations of 1705 may be performed according to the methods described herein. In some examples, aspects of the operations of 1705 may be performed by a TDD configuration identifier as described with reference to FIGS. 10 through 13.

At 1710, the UE may receive a configuration for measuring uplink signaling from a second wireless device (e.g., a first UE, an aggressor UE, a transmitting UE), the uplink signaling for measuring a CLI. The operations of 1710 may be performed according to the methods described herein. In some examples, aspects of the operations of 1710 may be performed by a CLI measuring configuration component as described with reference to FIGS. 10 through 13.

At 1715, the UE may receive, according to the received configuration, the uplink signaling in at least one symbol period of the slot. The operations of 1715 may be performed according to the methods described herein. In some examples, aspects of the operations of 1715 may be performed by an uplink signaling receiver as described with reference to FIGS. 10 through 13.

At 1720, the UE may determine the CLI based on the received uplink signaling. The operations of 1720 may be performed according to the methods described herein. In some examples, aspects of the operations of 1720 may be performed by a CLI determination component as described with reference to FIGS. 10 through 13.

Figure 18:
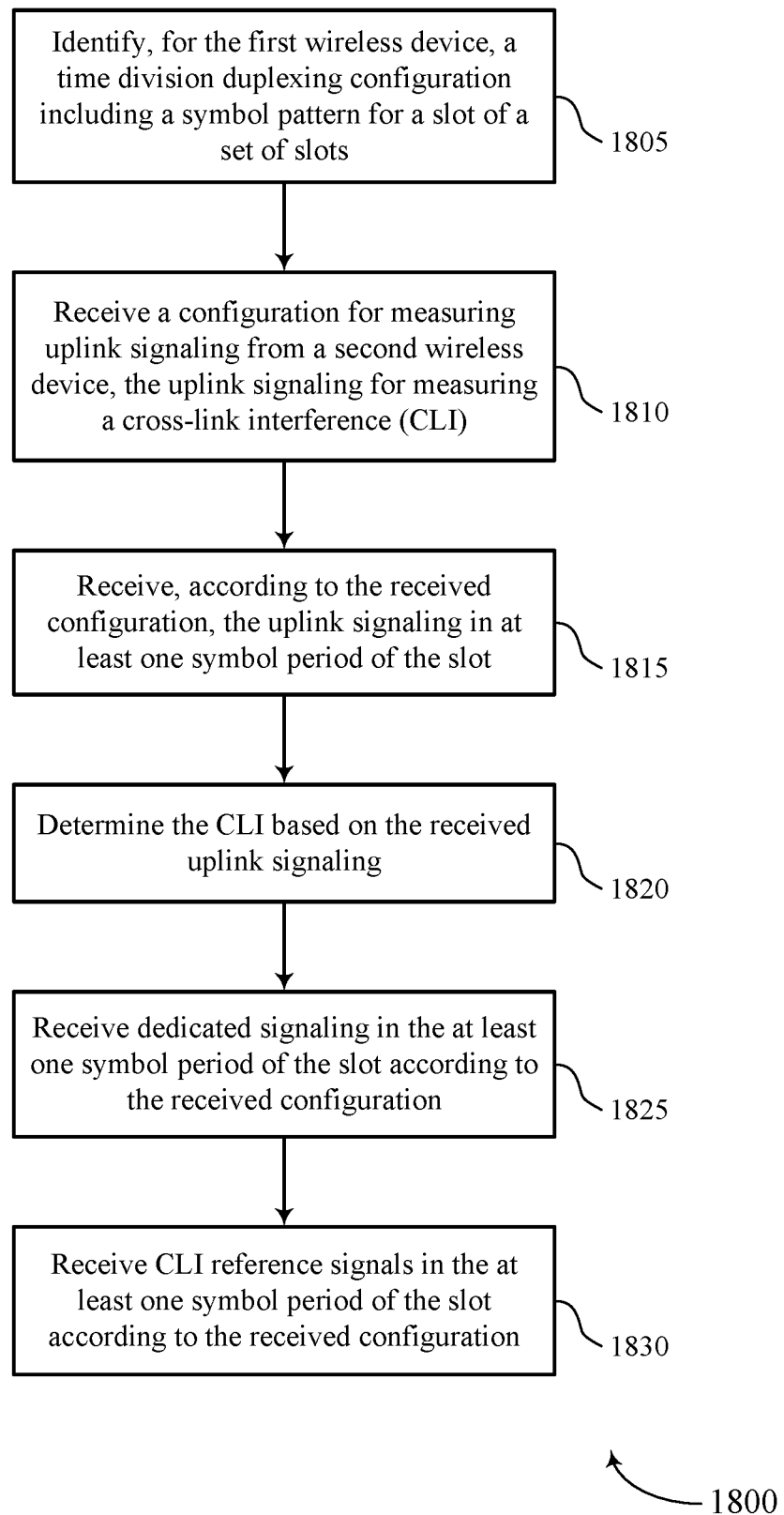

FIG. 18 shows a flowchart illustrating a method 1800 that supports CLI measurement transmission schemes in accordance with aspects of the present disclosure. The operations of method 1800 may be implemented by a UE 115 (e.g., a first wireless device, a victim UE 115, a receiving UE 115) or its components as described herein. For example, the operations of method 1800 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 1805, the UE may identify, for itself, a TDD configuration including a symbol pattern for a slot of a set of slots. The operations of 1805 may be performed according to the methods described herein. In some examples, aspects of the operations of 1805 may be performed by a TDD configuration identifier as described with reference to FIGS. 10 through 13.

At 1810, the UE may receive a configuration for measuring uplink signaling from a second wireless device (e.g., a first UE, an aggressor UE, a transmitting UE), the uplink signaling for measuring a CLI. The operations of 1810 may be performed according to the methods described herein. In some examples, aspects of the operations of 1810 may be performed by a CLI measuring configuration component as described with reference to FIGS. 10 through 13.

At 1815, the UE may receive, according to the received configuration, the uplink signaling in at least one symbol period of the slot. The operations of 1815 may be performed according to the methods described herein. In some examples, aspects of the operations of 1815 may be performed by an uplink signaling receiver as described with reference to FIGS. 10 through 13.

At 1820, the UE may determine the CLI based on the received uplink signaling. The operations of 1820 may be performed according to the methods described herein. In some examples, aspects of the operations of 1820 may be performed by a CLI determination component as described with reference to FIGS. 10 through 13.

At 1825, the UE may receive dedicated signaling in the at least one symbol period of the slot according to the received configuration. The operations of 1825 may be performed according to the methods described herein. In some examples, aspects of the operations of 1825 may be performed by an uplink signaling receiver as described with reference to FIGS. 10 through 13.

At 1830, the UE may receive CLI reference signals in the at least one symbol period of the slot according to the received configuration. The operations of 1830 may be performed according to the methods described herein. In some examples, aspects of the operations of 1830 may be performed by a CLI reference signal receiver as described with reference to FIGS. 10 through 13.

Figure 19:
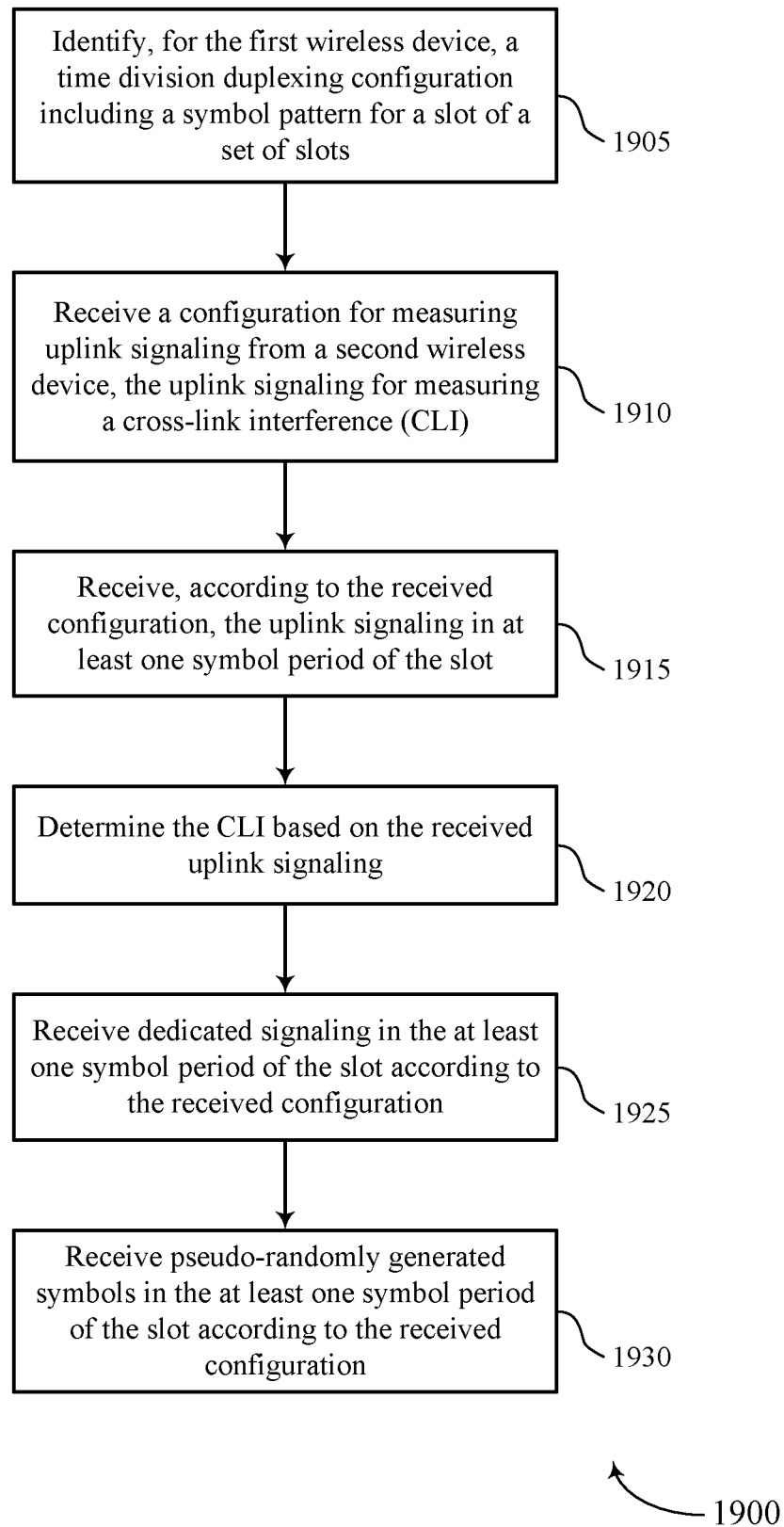

FIG. 19 shows a flowchart illustrating a method 1900 that supports CLI measurement transmission schemes in accordance with aspects of the present disclosure. The operations of method 1900 may be implemented by a UE 115 (e.g., a first wireless device, a victim UE 115, a receiving UE 115) or its components as described herein. For example, the operations of method 1900 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 1905, the UE may identify, for itself, a TDD configuration including a symbol pattern for a slot of a set of slots. The operations of 1905 may be performed according to the methods described herein. In some examples, aspects of the operations of 1905 may be performed by a TDD configuration identifier as described with reference to FIGS. 10 through 13.

At 1910, the UE may receive a configuration for measuring uplink signaling from a second wireless device (e.g., a first UE, an aggressor UE, a transmitting UE), the uplink signaling for measuring a CLI. The operations of 1910 may be performed according to the methods described herein. In some examples, aspects of the operations of 1910 may be performed by a CLI measuring configuration component as described with reference to FIGS. 10 through 13.

At 1915, the UE may receive, according to the received configuration, the uplink signaling in at least one symbol period of the slot. The operations of 1915 may be performed according to the methods described herein. In some examples, aspects of the operations of 1915 may be performed by an uplink signaling receiver as described with reference to FIGS. 10 through 13.

At 1920, the UE may determine the CLI based on the received uplink signaling. The operations of 1920 may be performed according to the methods described herein. In some examples, aspects of the operations of 1920 may be performed by a CLI determination component as described with reference to FIGS. 10 through 13.

At 1925, the UE may receive dedicated signaling in the at least one symbol period of the slot according to the received configuration. The operations of 1925 may be performed according to the methods described herein. In some examples, aspects of the operations of 1925 may be performed by an uplink signaling receiver as described with reference to FIGS. 10 through 13.

At 1930, the UE may receive pseudo-randomly generated symbols in the at least one symbol period of the slot according to the received configuration. The operations of 1930 may be performed according to the methods described herein. In some examples, aspects of the operations of 1930 may be performed by a random data receiver as described with reference to FIGS. 10 through 13.

Figure 20:
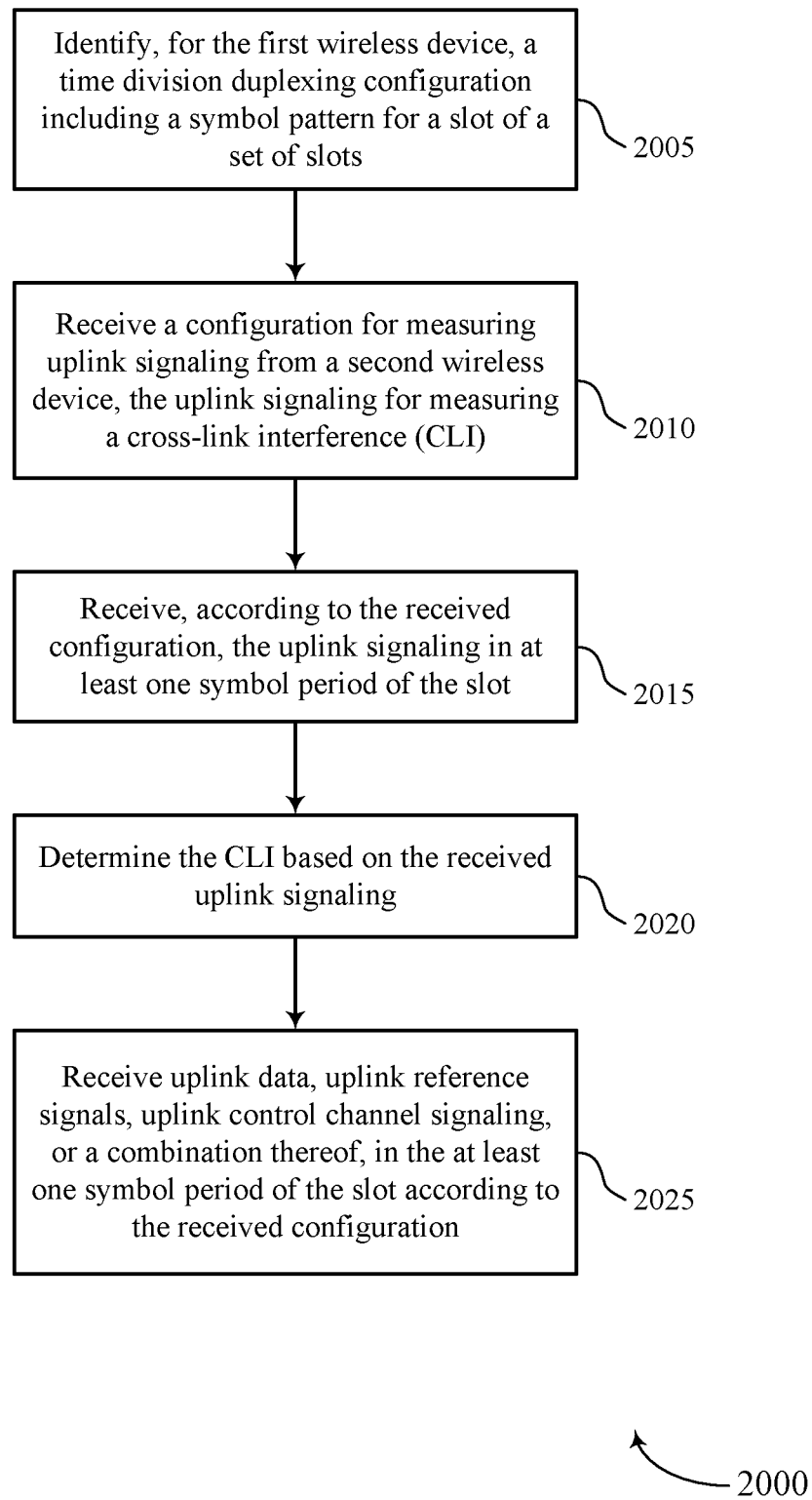

FIG. 20 shows a flowchart illustrating a method 2000 that supports CLI measurement transmission schemes in accordance with aspects of the present disclosure. The operations of method 2000 may be implemented by a UE 115 (e.g., a first wireless device, a victim UE 115, a receiving UE 115) or its components as described herein. For example, the operations of method 2000 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 2005, the UE may identify, for itself, a TDD configuration including a symbol pattern for a slot of a set of slots. The operations of 2005 may be performed according to the methods described herein. In some examples, aspects of the operations of 2005 may be performed by a TDD configuration identifier as described with reference to FIGS. 10 through 13.

At 2010, the UE may receive a configuration for measuring uplink signaling from a second wireless device (e.g., a first UE, an aggressor UE, a transmitting UE), the uplink signaling for measuring a CLI. The operations of 2010 may be performed according to the methods described herein. In some examples, aspects of the operations of 2010 may be performed by a CLI measuring configuration component as described with reference to FIGS. 10 through 13.

At 2015, the UE may receive, according to the received configuration, the uplink signaling in at least one symbol period of the slot. The operations of 2015 may be performed according to the methods described herein. In some examples, aspects of the operations of 2015 may be performed by an uplink signaling receiver as described with reference to FIGS. 10 through 13.

At 2020, the UE may determine the CLI based on the received uplink signaling. The operations of 2020 may be performed according to the methods described herein. In some examples, aspects of the operations of 2020 may be performed by a CLI determination component as described with reference to FIGS. 10 through 13.

At 2025, the UE may receive uplink data, uplink reference signals, uplink control channel signaling, or a combination thereof, in the at least one symbol period of the slot according to the received configuration. The operations of 2025 may be performed according to the methods described herein. In some examples, aspects of the operations of 2025 may be performed by an uplink signaling receiver as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any type of processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first wireless device, comprising:
   identifying, for the first wireless device, a time division duplexing configuration indicating a symbol pattern for a slot of a plurality of slots;
   receiving a configuration for measuring uplink signaling from a second wireless device, the uplink signaling for measuring a cross-link interference (CLI);
   receiving, according to the received configuration, the uplink signaling in at least one symbol period of the slot, wherein the at least one symbol period is indicated in the received configuration for measuring uplink signaling; and
   determining the CLI based at least in part on the received uplink signaling.

2. The method of claim 1, wherein receiving the configuration for measuring the uplink signaling further comprises:
   receiving the configuration in radio resource control signaling or downlink control information.

3. The method of claim 2, wherein the radio resource control signaling provides a periodic data channel configuration.

4. The method of claim 2, wherein the downlink control information provides a dynamic data channel configuration.

5. The method of claim 2, wherein the downlink control information provides a semi-persistent data channel configuration.

6. The method of claim 1, wherein receiving the uplink signaling comprises:
   receiving dedicated signaling in the at least one symbol period of the slot according to the received configuration.

7. The method of claim 6, wherein receiving the dedicated signaling comprises:
   receiving CLI reference signals in the at least one symbol period of the slot according to the received configuration.

8. The method of claim 7, wherein the received CLI reference signals are generated based at least in part on a Zadoff-Chu sequence or a Gold sequence.

9. The method of claim 7, wherein the CLI reference signals comprise uplink demodulation reference signals, or uplink channel state information reference signals, or a combination thereof.

10. The method of claim 7, wherein receiving the CLI reference signals in the at least one symbol period comprises:
    receiving the CLI reference signals in the at least one symbol period without corresponding uplink data.

11. The method of claim 6, wherein receiving the dedicated signaling comprises:
    receiving pseudo-randomly generated symbols in the at least one symbol period of the slot according to the received configuration.

12. The method of claim 1, wherein receiving the uplink signaling comprises:
    receiving uplink data, uplink reference signals, uplink control channel signaling, or a combination thereof, in the at least one symbol period of the slot according to the received configuration.

13. The method of claim 1, wherein:
    receiving the configuration for measuring the uplink signaling comprises receiving a second time division duplexing configuration for the slot, the second time division duplexing configuration changing an uplink transmission direction indicated by the identified time division duplexing configuration for the at least one symbol period to a downlink transmission direction; and
    receiving the uplink signaling comprises receiving the uplink signaling from the second wireless device in the at least one symbol period according to the downlink transmission direction.

14. The method of claim 1, wherein determining the CLI based at least in part on the received uplink signaling comprises:
measuring a signal strength of the received uplink signaling to determine a CLI value.

15. The method of claim 14, further comprising:
discarding the determined CLI value based at least in part on the measured signal strength being less than or equal to a signal strength threshold.

16. The method of claim 14, further comprising:
determining that the determined CLI value is valid based at least in part on the measured signal strength being greater than or equal to a signal strength threshold.

17. The method of claim 1, wherein receiving the uplink signaling comprises receiving dedicated uplink signaling in the at least one symbol period of the slot according to the received configuration, and further comprising:
identifying one or more timing offsets for a measurement window for receiving the uplink signaling from the second wireless device, wherein the CLI is determined based at least in part on the received dedicated uplink signaling for the measurement window.

18. The method of claim 1, wherein:
the second wireless device and the first wireless device are associated with a same cell of a base station; or
the second wireless device is associated with a first cell served by the base station, and the first wireless device is associated with a second cell served by the base station.

19. The method of claim 1, wherein the second wireless device is associated with a first cell served by a first base station, and the first wireless device is associated with a second cell served by a second base station.

20. A method for wireless communications at a second wireless device, comprising:
identifying a time division duplexing configuration for the second wireless device, wherein the time division duplexing configuration indicates a symbol pattern for a slot of a plurality of slots;
receiving a configuration for transmitting, to a first wireless device, dedicated signaling for measuring a cross-link interference (CLI); and
transmitting the dedicated signaling in at least one symbol period of the slot according to the received configuration, wherein the at least one symbol period is indicated in the received configuration for measuring uplink signaling.

21. The method of claim 20, wherein receiving the configuration comprises:
receiving the configuration in radio resource control signaling or downlink control information.

22. The method of claim 20, wherein transmitting the dedicated signaling comprises:
transmitting CLI reference signals in the at least one symbol period.

23. The method of claim 20, wherein transmitting the dedicated signaling comprises:
transmitting pseudo-randomly generated symbols in the at least one symbol period.

24. The method of claim 20, wherein:
receiving the configuration for transmitting dedicated signaling comprises receiving a second time division duplexing configuration for the slot, the second time division duplexing configuration changing a downlink transmission direction indicated by the identified time division duplexing configuration for the at least one symbol period to an uplink transmission direction; and
transmitting the dedicated signaling comprises transmitting uplink data in the at least one symbol period according to the received configuration.

25. The method of claim 20, further comprising:
identifying a timing advance for an uplink data channel of the slot; and
applying the identified timing advance to transmit the dedicated signaling.

26. The method of claim 20, further comprising:
identifying a first timing advance for an uplink data channel of the slot;
identifying a second timing advance for the dedicated signaling of the slot, the first timing advance different from the second timing advance; and
applying the second timing advance to transmit the dedicated signaling.

27. The method of claim 20, wherein transmitting the dedicated signaling in the at least one symbol period of the slot comprises:
transmitting, in the at least one symbol period of the slot, the dedicated signaling using one or more uplink transmit beams different from a serving transmit beam of a cell serving the second wireless device.

28. The method of claim 20, wherein transmitting the dedicated signaling in the at least one symbol period of the slot comprises:
transmitting, in the at least one symbol period of the slot, the dedicated signaling using a serving precoding matrix.

29. An apparatus for wireless communications at a second wireless device, comprising: a processor, memory coupled with the processor; and instructions stored in the memory and executable by the processor to cause the apparatus to:
identify a time division duplexing configuration for the second wireless device, wherein the time division duplexing configuration indicates a symbol pattern for a slot of a plurality of slots;
receive a configuration for transmitting, to a first wireless device, dedicated signaling for measuring a cross-link interference (CLI); and
transmit the dedicated signaling in at least one symbol period of the slot according to the received configuration, wherein the at least one symbol period is indicated in the received configuration for measuring uplink signaling.

30. An apparatus for wireless communications at a first wireless device, comprising: a processor, memory coupled with the processor; and instructions stored in the memory and executable by the processor to cause the apparatus to:
identify, for the first wireless device, a time division duplexing configuration indicating a symbol pattern for a slot of a plurality of slots;
receive a configuration for measuring uplink signaling from a second wireless device, the uplink signaling for measuring a cross-link interference (CLI);
receive, according to the received configuration, the uplink signaling in at least one symbol period of the slot, wherein the at least one symbol period is indicated in the received configuration for measuring uplink signaling; and
determine the CLI based at least in part on the received uplink signaling.

* * * * *